(12) United States Patent
Yamaguchi et al.

(10) Patent No.: US 8,310,514 B2
(45) Date of Patent: *Nov. 13, 2012

(54) LINE HEAD CONTROL METHOD, IMAGE FORMING METHOD, AND IMAGE FORMING APPARATUS

(75) Inventors: Kenji Yamaguchi, Matsumoto (JP); Nozomu Inoue, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 1005 days.

This patent is subject to a terminal disclaimer.

(21) Appl. No.: 12/333,961

(22) Filed: Dec. 12, 2008

(65) Prior Publication Data

US 2009/0168086 A1    Jul. 2, 2009

(30) Foreign Application Priority Data

Dec. 28, 2007  (JP) ................................ 2007-339938
Aug. 21, 2008  (JP) ................................ 2008-212624

(51) Int. Cl.
*B41J 2/45* (2006.01)

(52) U.S. Cl. ...................................................... 347/238

(58) Field of Classification Search .................. 347/229, 347/234, 235, 238, 248–250
See application file for complete search history.

(56) References Cited

U.S. PATENT DOCUMENTS

| | | | | | |
|---|---|---|---|---|---|
| 5,835,119 | A | * | 11/1998 | Samuels | 347/238 |
| 6,323,890 | B1 | * | 11/2001 | Muto et al. | 347/237 |
| 7,808,519 | B2 | * | 10/2010 | Nomura et al. | 347/234 |
| 7,924,303 | B2 | * | 4/2011 | Yamaguchi et al. | 347/238 |

FOREIGN PATENT DOCUMENTS

JP    05-261970    10/1993

* cited by examiner

*Primary Examiner* — Hai C Pham
(74) *Attorney, Agent, or Firm* — DLA Piper LLP (US)

(57) ABSTRACT

A control method of a line head including a first image forming system; a first light emission element which emits light for forming an image by an image forming lens of the first image forming system; a second image forming system disposed in a first direction of the first image forming system; and a second light emission element which emits light for forming an image by an image forming lens of the second image forming system is disclosed. The method includes, when the first light emission element emits light at a time t0 and then emits light after a time t1 from the time t0, and also when the second light emission element emits light after a time t2 from the time t0, controlling the time t1 and the time t2 such that $t2 \neq n \cdot t1$ (n: 2 or larger integer) holds.

12 Claims, 18 Drawing Sheets

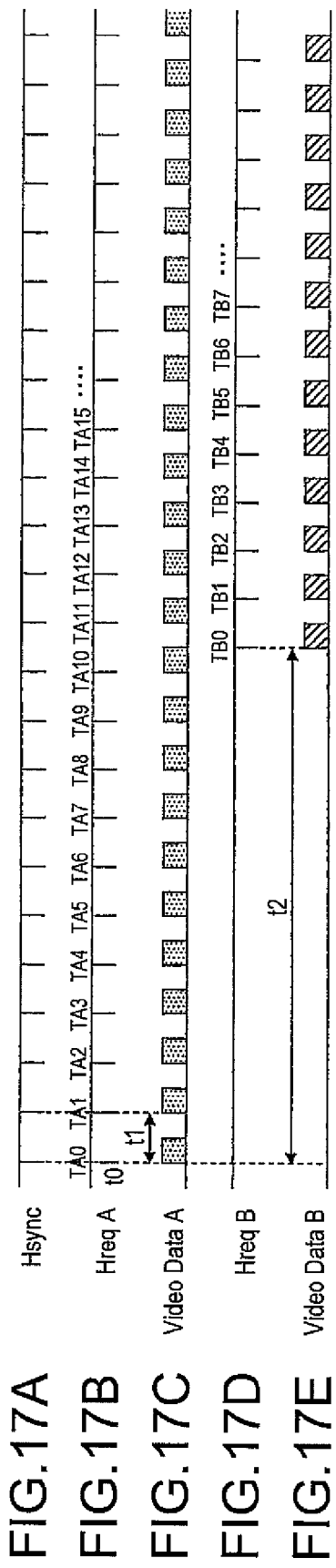

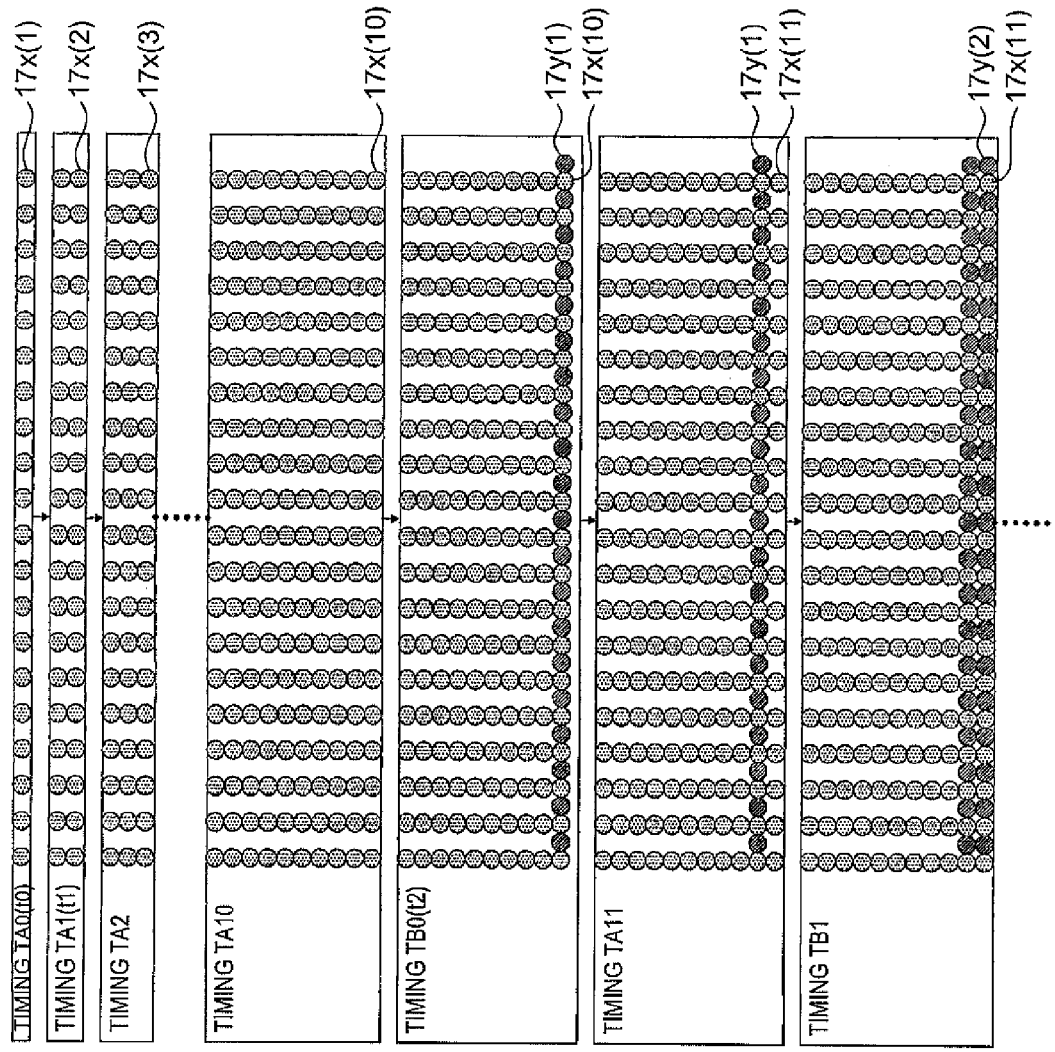

LINE HEAD CONTROL METHOD, IMAGE FORMING METHOD, AND IMAGE FORMING APPARATUS

CROSS REFERENCE TO RELATED ART

The disclosure of Japanese Patent Applications No. 2007-339938 filed on Dec. 28, 2007 and No. 2008-212624 filed on Aug. 21, 2008 including specification, drawings and claims is incorporated herein by reference in its entirety.

BACKGROUND

1. Technical Field

The present invention relates to a line head control method, an image forming method, and an image forming apparatus capable of correcting exposure spot displacement to prevent deterioration of image quality.

2. Related Art

An exposure light source of an image forming apparatus which includes a line head using LED is known. JP-A-5-261970 proposes a technology which corrects displacement of exposure spot in a sub scanning direction of an LED line head containing light emission elements in zigzag shape. According to this technology, odd number data and even number data are separated from one another, and each of the data is stored at a write address shifted from the other data by the amount of the difference between odd number light emission element line and even number light emission element line when each data is written to an odd number frame memory and an even number frame memory. Then, exposure spot displacement between odd number dot and even number dot is corrected by a value integer number times larger than the exposure spot diameter (single dot diameter) through sequential read of data from the respective frame memories in synchronization with one strobe signal (in synchronization with line data cycle).

According to the method disclosed in JP-A-5-261970, in case of electronic picture printer using an intermediate transfer belt, for example, there is a possibility that exposure spot displacement cannot be appropriately corrected. This point is now explained with reference to FIGS. 19A and 19B. FIG. 19A shows a line head 10, a photosensitive body 41, an intermediate transfer belt 50 wounded around a drive roller 51 and a driven roller 52 (transfer roller) and rotating in an R direction indicated by an arrow, and recording sheet P fed in an S direction indicated by an arrow such that a toner image is transferred to the recording sheet P at the position of the transfer roller 52. In a typical electronic picture printer using the intermediate transfer belt, the tension of the intermediate transfer belt is controlled according to the ratio of the rotation speed of the photosensitive body 41 to the rotation speed of the intermediate transfer belt 50, i.e., the rotation speed of the drive roller 51 so as to prevent transverse stripes (banding) regularly generated when the toner image is transferred onto the recording sheet P.

In this step, the image expands and contracts in the sub scanning direction depending on the ratio of the rotation speed of the photosensitive body 41 to the rotation speed of the intermediate transfer belt 50, i.e., the rotation speed of the drive roller 51. Thus, the pitch between dots in the sub scanning direction of the image (exposure spot pitch) becomes a value other than a value integer number times larger than the exposure spot diameter (single dot diameter), that is, becomes a value non-integer number time larger than the exposure spot diameter in some cases. FIG. 19A shows the case of the photosensitive body 41 rotating at a low speed and the drive roller 51 rotating at a high speed. In this case, the intermediate transfer belt 50 is tensioned. FIG. 19B shows the case of the photosensitive body 41 rotating at a high speed and the drive roller 51 rotating at a low speed. In this case, the tension of the intermediate transfer belt 50 is reduced, and relaxation Rx of the tension is produced.

In this case, the exposure spot displacement is corrected only by a value integer number times larger than the exposure spot diameter (single dot diameter) according to the structure shown in JP-A-5-261970. Thus, accurate correction cannot be achieved when the exposure spot pitch in the sub scanning direction is a value non-integer times larger than the exposure spot diameter. For example, when a linear latent image is formed in the axial direction of the photosensitive body (main scanning direction), decimal times larger part of the non-integer times larger value cannot be corrected. In this case, a small gap is produced in the rotation direction of the photosensitive body (sub scanning direction). As a result, the image quality is deteriorated.

SUMMARY

It is an advantage of some aspects of the invention to provide a line head control method, an image forming method, and an image forming apparatus capable of correcting exposure spot displacement and improving image quality.

A line head control method according to a first aspect of the invention includes: a first image forming system; a first light emission element which emits light for forming an image by an image forming lens of the first image forming system; a second image forming system disposed in a first direction of the first image forming system; and a second light emission element which emits light for forming an image by an image forming lens of the second image forming system. When the first light emission element emits light at a time t0 and then emits light after a time t1 from the time t0, and also when the second light emission element emits light after a time t2 from the time t0, the time t1 and the time t2 are controlled such that $t2 \neq n \cdot t1$ (n: 2 or larger integer) holds.

It is preferable that a first spot pitch between a first latent image formed on a scanned surface shifting in the first direction when the first light emission element emits light at the time t0 and a second latent image formed on the scanned surface when the first light emission element emits light at the time t1 is a value non-integer times larger than the spot diameter of a latent image formed on the scanned surface by the first light emission element in the line head control method.

It is preferable that the first latent image and a third latent image formed on the scanned surface when the second light emission element emits light at the time t2 are disposed orthogonal to or substantially orthogonal to the first direction in the line head control method.

It is preferable to further include a third light emission element disposed in the first direction of the first light emission element to emit light for forming an image by the first image forming system in the line head control method. In this case, a second spot pitch between the first latent image and a fourth latent image formed on the scanned surface by the third light emission element is a value non-integer times larger than the spot diameter of the latent image.

It is preferable that the image forming system is a lens having minus optical magnification in the line head control method.

An image forming method according to a second aspect of the invention includes: a latent image carrying body which shifts in a first direction; a first image forming system; a first light emission element which emits light for forming an image by an image forming lens of the first image forming system; a second image forming system disposed in the first direction of the first image forming system; and a second light emission element which emits light for forming an image by an image forming lens of the second image forming system. When the first light emission element emits light at a time t0 and then emits light after a time t1 from the time t0, and also when the second light emission element emits light after a time t2 from the time t0, the time t1 and the time t2 are controlled such that t2≠n·t1 (n: 2 or larger integer) holds.

It is preferable that a first spot pitch between a first latent image formed on the latent image carrying body when the first light emission element emits light at the time t0 and a second latent image formed on the latent image carrying body when the first light emission element emits light at the time t1 is a value non-integer times larger than the spot diameter of a latent image formed on the latent image carrying body by the first light emission element in the image forming method.

It is preferable that the first latent image and a third latent image formed on the latent image carrying body when the second light emission element emits light at the time t2 are disposed in a second direction orthogonal to or substantially orthogonal to the first direction in the image forming method.

It is preferable to further include a third light emission element disposed in the first direction of the first light emission element to emit light for forming an image by the first image forming system in the image forming method. In this case, a second spot pitch between the first latent image and a fourth latent image formed on the latent image carrying body by the third light emission element is a value non-integer times larger than the spot diameter of the latent image.

It is preferable that the first image forming system and the second image forming system are lenses having minus optical magnification in the image forming method.

It is preferable that the first image forming system is an inverting system in the image forming method. In this case, the first latent image is formed after the fourth latent image is formed, and the fourth latent image and the first latent image are disposed in the second direction of the latent image carrying body.

It is preferable to further include a fourth light emission element disposed in a third direction opposite to the first direction of the second light emission element to emit light for forming an image by the second image forming system in the image forming method. In this case, wherein a third spot pitch between the second latent image and a fifth latent image formed on the latent image carrying body by the fourth light emission element is a value non-integer times larger than the spot diameter of the latent image.

It is preferable that the second image forming system is an inverting system in the image forming method. In this case, the second latent image is formed after the fifth latent image is formed, and the fifth latent image and the second latent image are disposed in the second direction of the latent image carrying body.

It is preferable that the first latent image, the third latent image, the fourth latent image, and the fifth latent image are disposed in the second direction of the latent image carrying body in the image forming method.

An image forming apparatus according to a third aspect of the invention includes: a latent image carrying body which shifts in a first direction; a first image forming system; a first light emission element which emits light for forming an image by an image forming lens of the first image forming system; a second image forming system disposed in the first direction of the first image forming system; and a second light emission element which emits light for forming an image by an image forming lens of the second image forming system. When the first light emission element emits light at a time t0 and then emits light after a time t1 from the time t0, and also when the second light emission element emits light after a time t2 from the time t0, the time t1 and the time t2 are controlled such that t2≠n·t1 (n: 2 or larger integer) holds.

BRIEF DESCRIPTION OF THE DRAWINGS

The invention will be described with reference to the accompanying drawings, wherein like numbers reference like elements.

FIG. 17 is a timing chart of the embodiment shown in FIG. 16.

FIG. 18 illustrates the embodiment shown in FIG. 16.

DESCRIPTION OF EXEMPLARY EMBODIMENTS

Figure 10A:
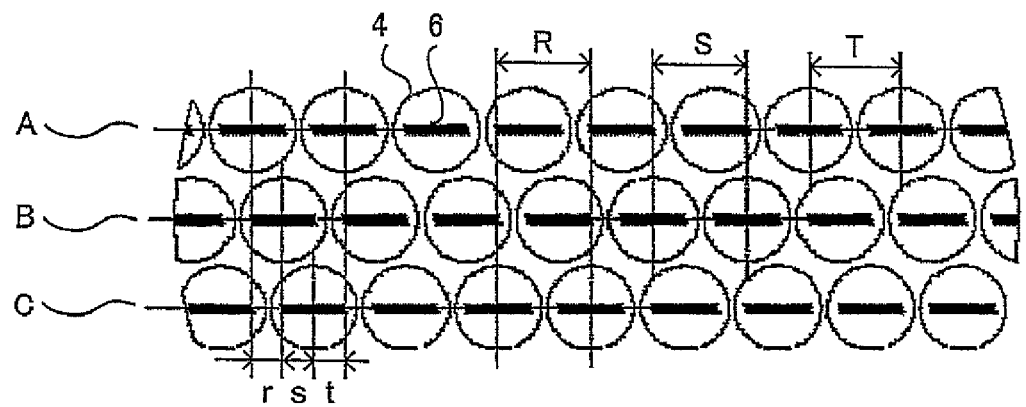
FIGS. 10A and 10B illustrate an example of the invention.
Figure 10B:
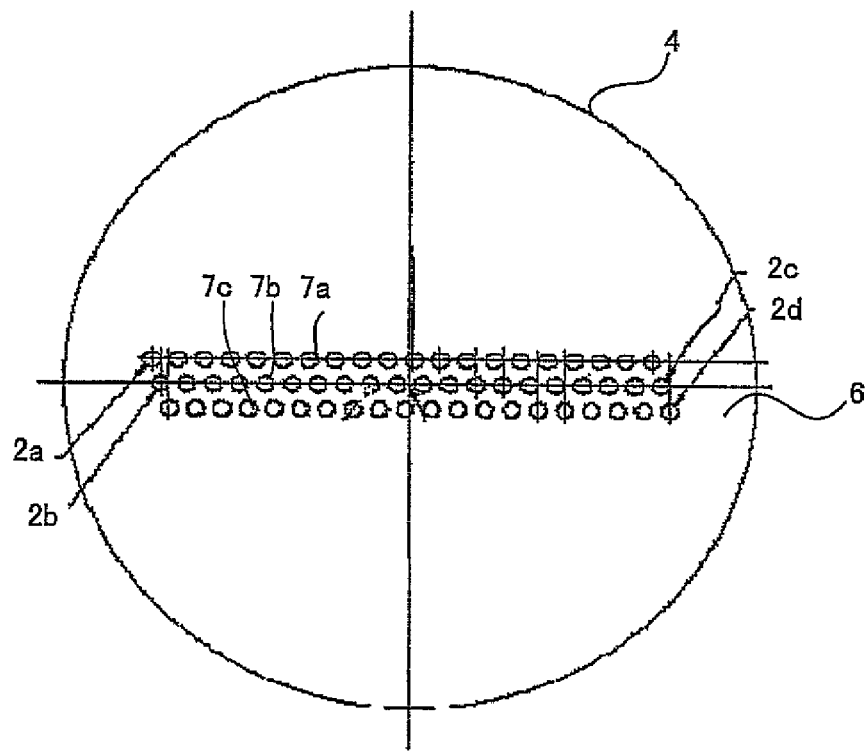

Exemplary embodiments of the invention are hereinafter described with reference to the drawings. FIGS. 10A and 10B illustrate an example of the invention. FIG. 10A is a plan view showing a part of a line head, viewing light emission element groups 6 through image forming lenses 4, and FIG. 10B is a plan view showing the relationship between one of the image forming lenses 4 and the corresponding light emission element group 6. As illustrated in FIG. 10A, a plurality of the light emission element groups 6 are disposed in the axial direction (main scanning direction) of the photosensitive body in correspondence with the respective image forming lenses 4. The light emission element groups 6 are provided on a substrate.

In this embodiment, the condition in which the plural light emission element groups are disposed in the axial direction of the photosensitive body is defined as "light emission element group line". In FIG. 10A, plural light emission group lines A, B, and C are positioned in the rotation direction (sub scanning direction) of the photosensitive body. The respective light emission element group lines A through C constitute a light emission array. In the adjoining light emission element groups on the light emission element group lines A through C in the axial direction of the photosensitive body, lengths R, S and T between the center positions are determined equal to one another. Also, in the adjoining light emission element groups on the light emission element group lines A through C in the direction orthogonal to the axial direction of the photosensitive body, lengths r, s and t between the center positions are determined equal to one another.

In FIG. 10B, each of components 2a through 2d is a single light emission element, and a light emission line 7a containing a plurality of light emission elements is provided on the light emission groups 6 in the axial direction of the photosensitive body. The plural light emission element lines are disposed in the rotation direction of the photosensitive body, and light emission element lines 7a, 7b, and 7c are provided in the case shown in FIG. 10B. Thus, in the case shown in FIGS. 10A and 10B, the three light emission element lines 7a, 7b, and 7c are provided on the light emission element group line A, for example. Also, three lines of the image forming lenses 4 are provided in the rotation direction of the photosensitive body.

Figure 11:
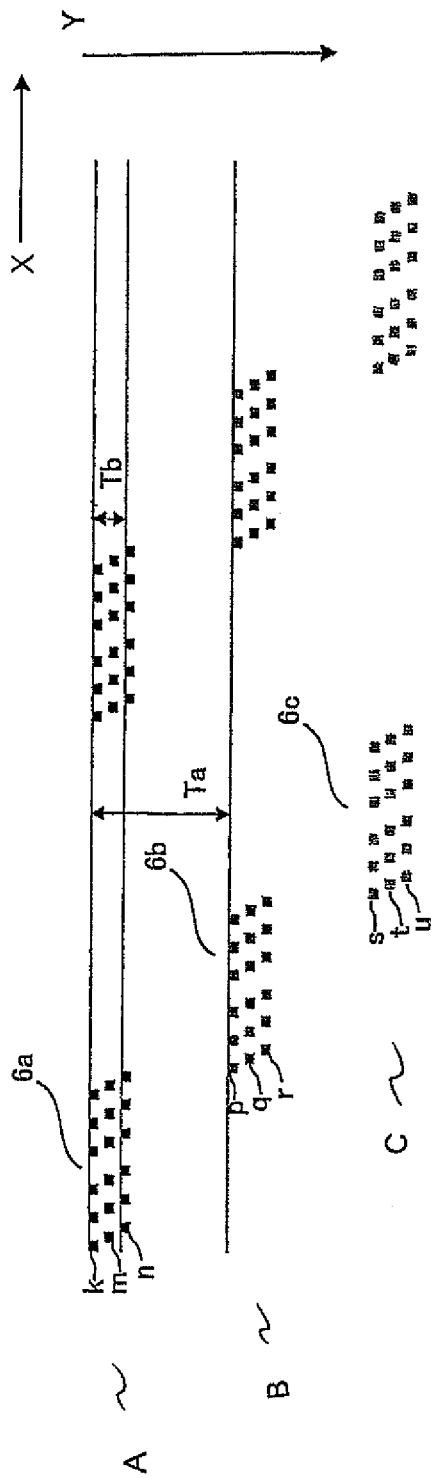
FIG. 11 illustrates the example shown in FIGS. 10A and 10B.

FIG. 11 illustrates an example of generation of exposure spot displacement on the line head on which the image forming lenses 4 and the light emission element groups 6 are disposed in one-to-one correspondence as shown in FIG. 10. In FIG. 11, the respective light emission element group lines A through C are provided, and the light emission element groups are disposed in correspondence with the not-shown image forming lenses. An arrow X corresponds to the axial direction of the photosensitive body, and an arrow Y corresponds to the rotation direction of the photosensitive body. The combination lens is constituted by lenses having minus optical magnification (ML), and a group of MLs forms a lens array (MLA).

FIG. 11 shows latent image patterns 6a, 6b, and 6c formed on the photosensitive body when exposure spot displacement of the MLA is not corrected. A length Ta represents the exposure spot pitch between lens lines of the MLA (spot pitch between light emission element group lines), and a length Tb represents the spot pitch between light emission element lines. The phrase "between lens lines" refers to the relationship between lenses when the plural image forming lenses are disposed in the rotation direction of the photosensitive body. The latent image pattern 6a contains latent image rows k through n. The latent image pattern 6b contains latent image rows p through r. The latent image pattern 6c contains latent image rows s through u.

Figure 12:
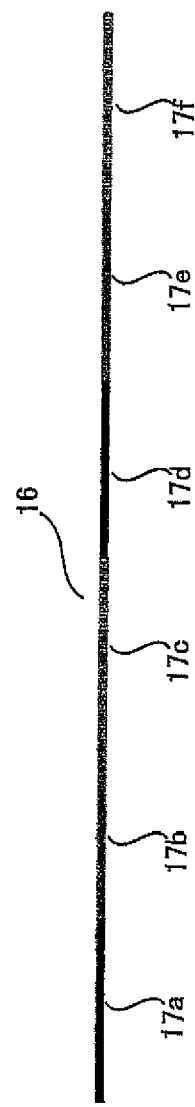
FIG. 12 illustrates the example shown in FIGS. 10A and 10B.

FIG. 12 illustrates a latent image after correction of exposure spot displacement of the MLA, that is, the original image. At this time, a latent image 16 is formed on the photosensitive body as 17a through 17f by output lights transmitted through the respective MLs. Thus, the corresponding latent image is formed as a linear image in the axial direction (main scanning direction) of the photosensitive body. Accordingly, deterioration of image quality can be prevented. According to this embodiment, the spot displacement between the light emission element lines and the exposure spot displacement between the lens lines are corrected by controlling the operation timing of the light emission element lines and the operation timing of the light emission element group lines. This example is now described in more detail.

Figure 1:
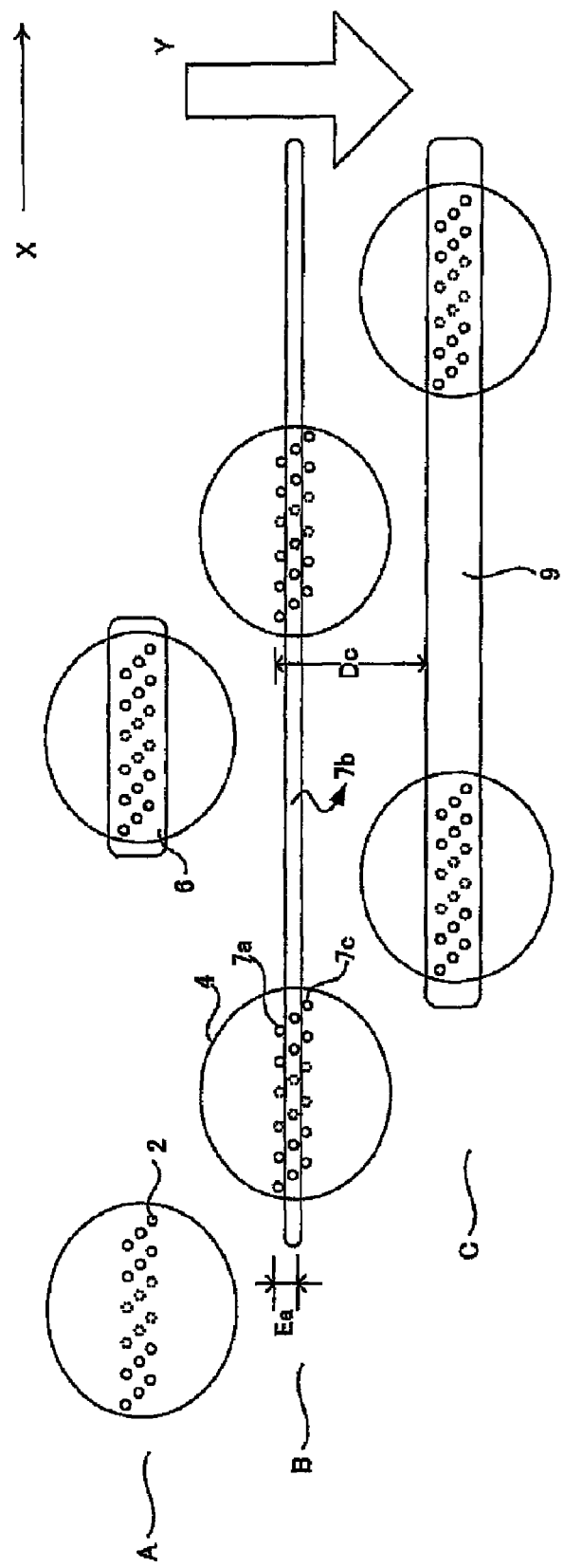
FIG. 1 illustrates an embodiment of the invention.

FIG. 1 illustrates an embodiment of the invention. FIG. 1 shows arrangement of the light emission elements such as "light emission element lines" similar to those shown in FIGS. 10A and 10B and terms such as "spot pitch between light emission element lines" similar to those shown in FIG. 11 in one drawing. Each of the image forming lenses 4 contains a plurality of the light emission elements 2 in the X direction (second direction, axial direction of photosensitive body) and in the Y direction (first direction, rotation direction of photosensitive body), thereby constituting the light emission element group 6.

The plural image forming lenses 4 are provided in the X direction and Y direction, and a set of the light emission element groups 6 provided in such a manner as to correspond to the arrangement of the image forming lenses 4 in the X direction constitutes a light emission element group line 9. In case of the structure shown in FIG. 1, the light emission element group lines A through C are provided. A set of the light emission element disposed in a row in the X direction contained in each of the light emission element group lines 9 constitutes each of the light emission element lines 7a through 7c. A length Ea represents the spot pitch between the light emission element lines corresponding to the length Tb shown in FIG. 11, and a length Dc represents the exposure spot pitch between the lens lines (spot pitch between light emission element group lines) corresponding to the length Ta shown in FIG. 11. In this structure, the light emission elements on the light emission element line 7a for emitting light forming an image by an image forming system (first image forming system) corresponding to the light emission element group line A are referred to as first light emission elements as well. The light emission elements on the light emission element line 7b disposed in the first direction (Y direction) of the first light emission elements are referred to as third light emission elements as well. The latent image formed on the photosensitive body on the scanned surface by the first light emission elements is referred to as first latent image as well. The latent image formed on the scanned surface by the third light emission elements is referred to as fourth latent image as well. Second light emission elements, second latent image, and third latent image will be described later in conjunction with FIGS. 16 and 18.

Figure 2:
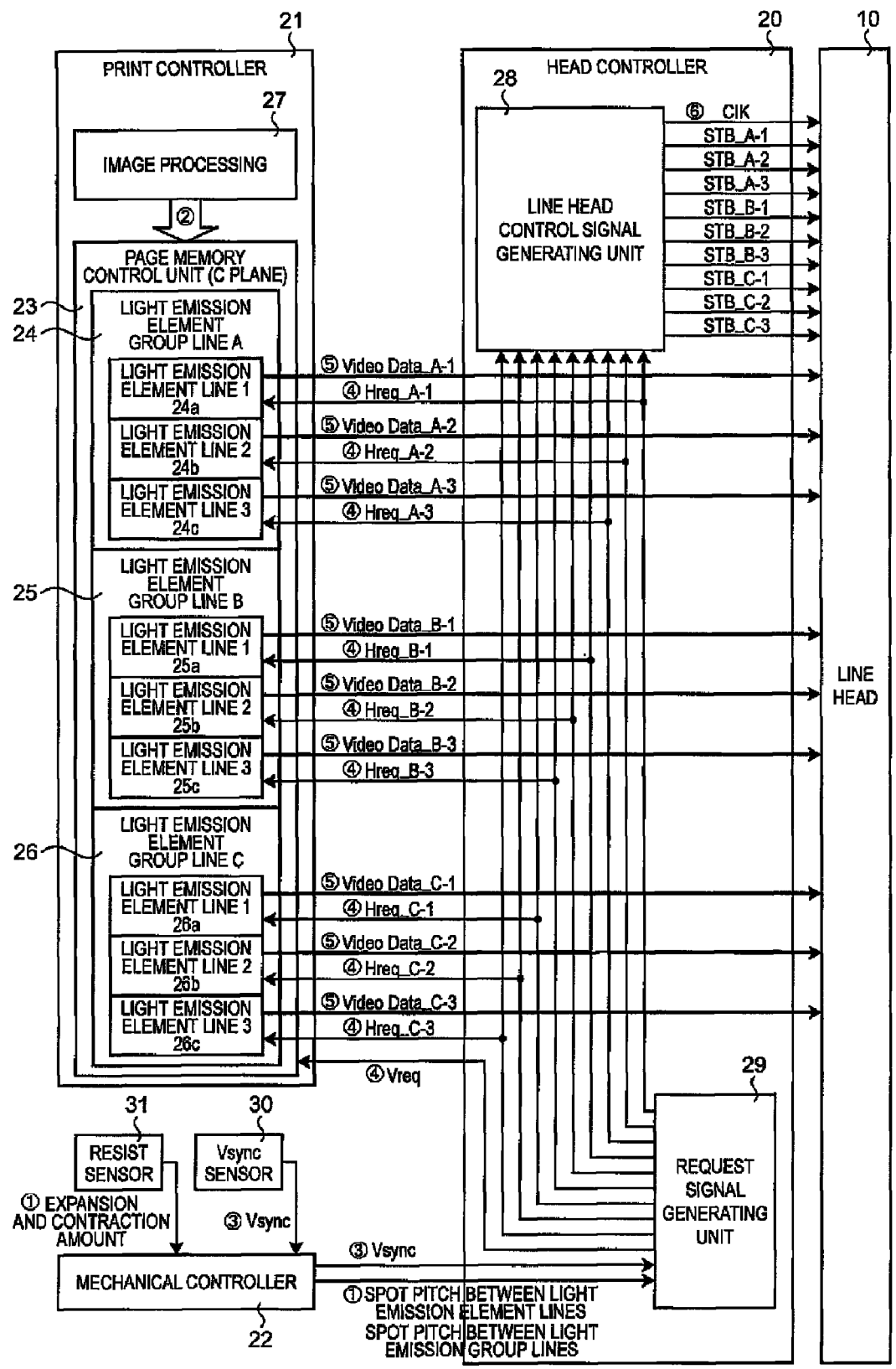
FIG. 2 is a block diagram of the embodiment shown in FIG. 1.

FIG. 2 is a block diagram of a control unit according to this embodiment. FIG. 2 shows a head controller 20, a print controller 21, and a mechanical controller 22 as a control unit of the line head 10. The print controller 21 has an image processing unit 27, and the head controller 20 has a line head control signal generating unit 28 and a request signal generating unit 29.

As described with reference to FIG. 1, the structure of the MLA and the light emission element in FIG. 2 includes three light emission element group lines (lens lines; A line, B line, and C line), and each of the light emission element group lines has three light emission element lines (1st line, 2nd line, and 3rd line). On the light emission element group line B shown in FIG. 2, the light emission element lines 7a through 7c shown in FIG. 1 correspond to the 1st through 3rd lines, respectively. FIG. 2 shows only C plane in the print controller 21, but M, Y, and K planes have similar structures.

The control process shown in FIG. 2 is now described. In this description, circled numerals are expressed as circle 1 for the reason of transcription conversion. Resist sensing at the time of printer start is used to calculate expansion and contraction amount of the image according to the ratio of the photosensitive body rotation speed to the intermediate transfer belt rotation speed. Initially, the printed resist mark is read by a resist sensor 31 which uses a reflection-type photosensor or the like to measure the expansion and contract amount of the image by μm (circle 1). Then, a CPU of the mechanical controller 22 calculates the spot pitch between the light emission element lines and the spot pitch between the light emission element group lines based on the expansion and contraction amount of the measured read image, and transmits the calculated pitches to the request signal generating unit 29 of the head controller 20 (circle 1).

After the start of printing, the image processing unit 27 of the print controller 21 processes image data for one page of the image, and transmits the processed image data to a page memory control unit (C plane) 23 (circle 2). The page memory control unit 23 separates the processed data of the image into data of the light emission element lines and data of the light element group lines, and stores the separated data in page memories 24 through 26 corresponding to the light emission element group lines A through C. Since the image data is produced by the print controller as the external controller of the line head, the process volume performed by the line head control unit can be reduced.

Thus, the data of the image for which processing such as screen processing and color conversion has been performed is stored in the page memories 24 through 26. Each of the page memories 24 through 26 is divided into image data memories for each of the light emission element lines 1 through 3. For example, the page memory 24 is divided into image data memories 24a through 24c. Thus, the page memories 24 through 26 are also used as image data memories. It is preferable to use a dividing circuit or a CPU for dividing the processed data of the image into the light emission element lines and the light emission element group lines.

The mechanical controller 22 detects the end of the printing sheet by an optical sensor (Vsync sensor) 30, and transmits a video data synchronous signal (Vsync signal) to the request signal generating unit 29 of the head controller 20 (circle 3).

The request signal generating unit 29 of the head controller 20 receives the Vsync signal and transmits a video data request signal (Vreq signal) to each of the planes (circle 4). Then, the request signal generating unit 29 generates a line data request signal for each of the light emission element lines and the light emission element group lines (Hreq_A-1, Hreq_A-2, Hreq_A-3, and others) based on the calculated spot pitch between the light emission element lines and the calculated spot pitch between the light emission element group lines, and transmits the line data request signals to the page memory control unit 23 of the print controller 21 (circle 4).

The request signal generating unit 29 also transmits the line data request signal for each of the light emission element lines and the light emission element group lines to the line head control signal generating unit 28 (circle 4) such that each drive circuit of the light emission element lines of the line head 10 can be synchronized with each drive circuit of the light emission element group lines. These drive circuits will be described in detail later with reference to FIG. 3.

The page memory control unit 23 transmits video data for each of the light emission element lines and the light emission element group lines (VideoData_A-1, VideoData_B-1, VIdeoData_C-1, and others) to the line head 10 in synchronization with the respective line data request signals (Hreq_A-1, Hreq_A-2, Hreq_A-3, and others) (circle 5). In this case, the respective line data request signals have different pulse generation timing according to the degree of exposure spot displacement of the corresponding light emission element lines and light emission element group lines. The details of the pulse generating timing will be described later with reference to FIG. 4. The exposure spot displacement can be corrected by this difference of the pulse generating timing even when the spot pitch between the light emission element lines and the spot pitch between the light emission element group lines are values non-integer times larger than the exposure spot diameter (single dot diameter).

The line head control signal generating unit 28 generates various types of signals (clock signals and strobe signals) for controlling the line head 10, and transmits the generated signals to the line head 10. The respective strobe signals (STB_A-1, STB_B-1, STB_C-1, and others) are synchronized with the line data request signals (Hreq_A-1, Hreq_A-2, Hreq_A-3, and others).

Figure 3:
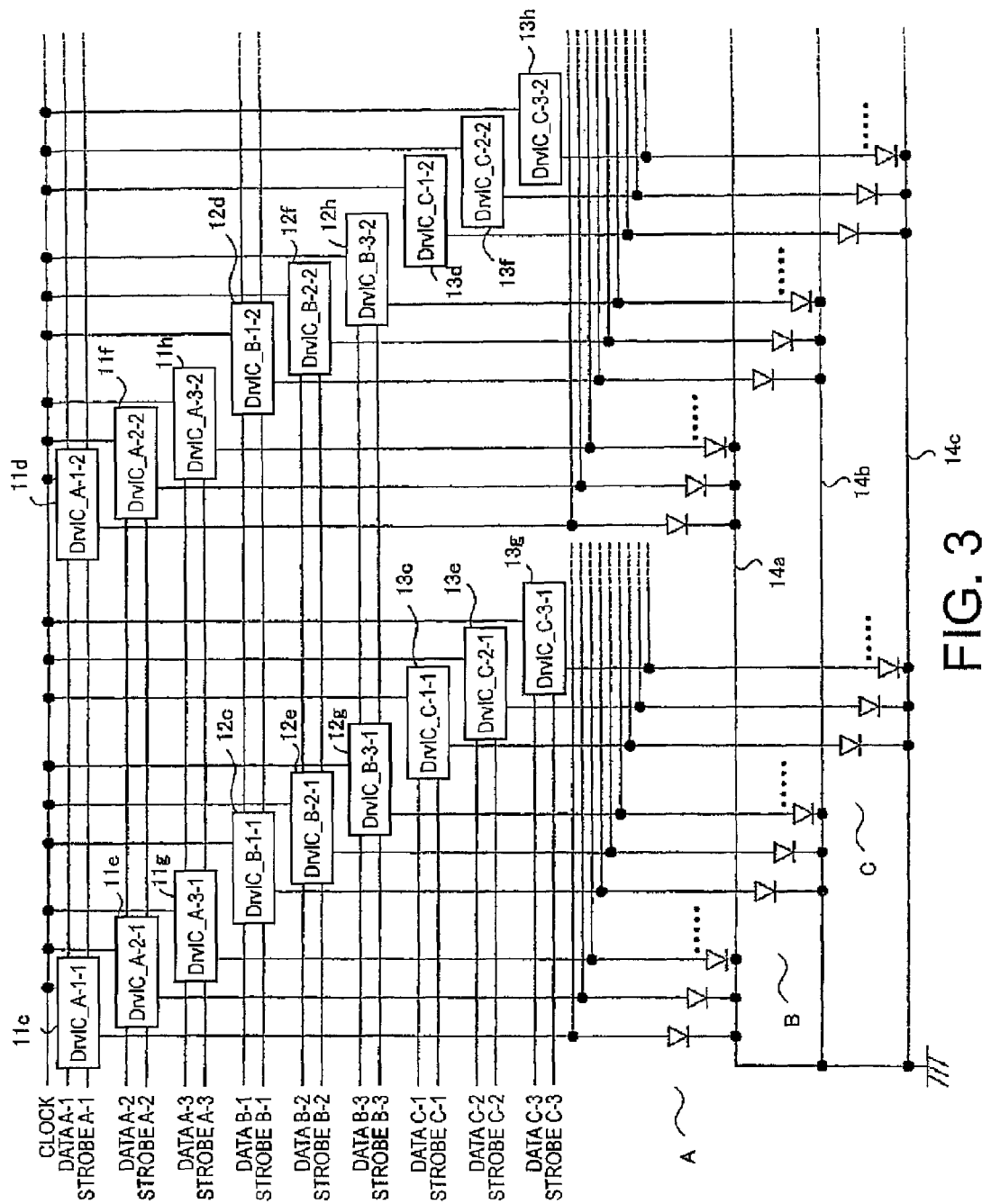
FIG. 3 is a circuit diagram of the embodiment shown in FIG. 1.

FIG. 3 is a circuit diagram showing the structure according to this embodiment. As shown in FIG. 3, the light emission elements on the light emission element group line A are controlled by drive circuits 11c through 11h. The light emission elements on the light emission element group line B are controlled by drive circuits 12c through 12h. The light emission elements on the light emission element group line C are controlled by drive circuits 13c through 13h. Power source lines 14a through 14c are also provided.

Clock signals are supplied to all of the drive circuits 11c through 11h, 12c through 12h, and 13c through 13h. The data signals A-1 through A-3 correspond to video data (VideoData A-1 through A-3) of FIG. 2, and are supplied to the drive circuits 11c through 11h. The strobe signals A-1 through A-3 are also supplied to the drive circuits 11c through 11h. The data signals B-1 through B-3 and the strobe signals B-1 through B-3 are supplied to the drive circuits 12c through 12h. The data signals C-1 through C-3 and the strobe signals C-1 through C-3 are supplied to the drive circuits 13c through 13h.

The strobe signals A-1 through C-3 are signals for specifying the period during which the light emission elements emit light. In case of the structure shown in FIG. 3, the strobe signals (A-1 through A-3) have different timing for each of the light emission element lines. Also, the strobe signals (A-1 through C-3) for each of the light emission element group lines corresponding to the respective light emission element group lines (A through C) have different timing for each of the groups.

Since the strobe signals have different operation timing, the exposure timing for each of the light emission element lines and that for each of the light emission element group lines are controlled for each frequency of clocks. Thus, the exposure spot displacement can be corrected with high accuracy even when the spot pitch between the light emission element lines and the spot pitch between the light emission element group lines are values non-integer times larger than the exposure spot diameter (single dot diameter).

Figure 4:
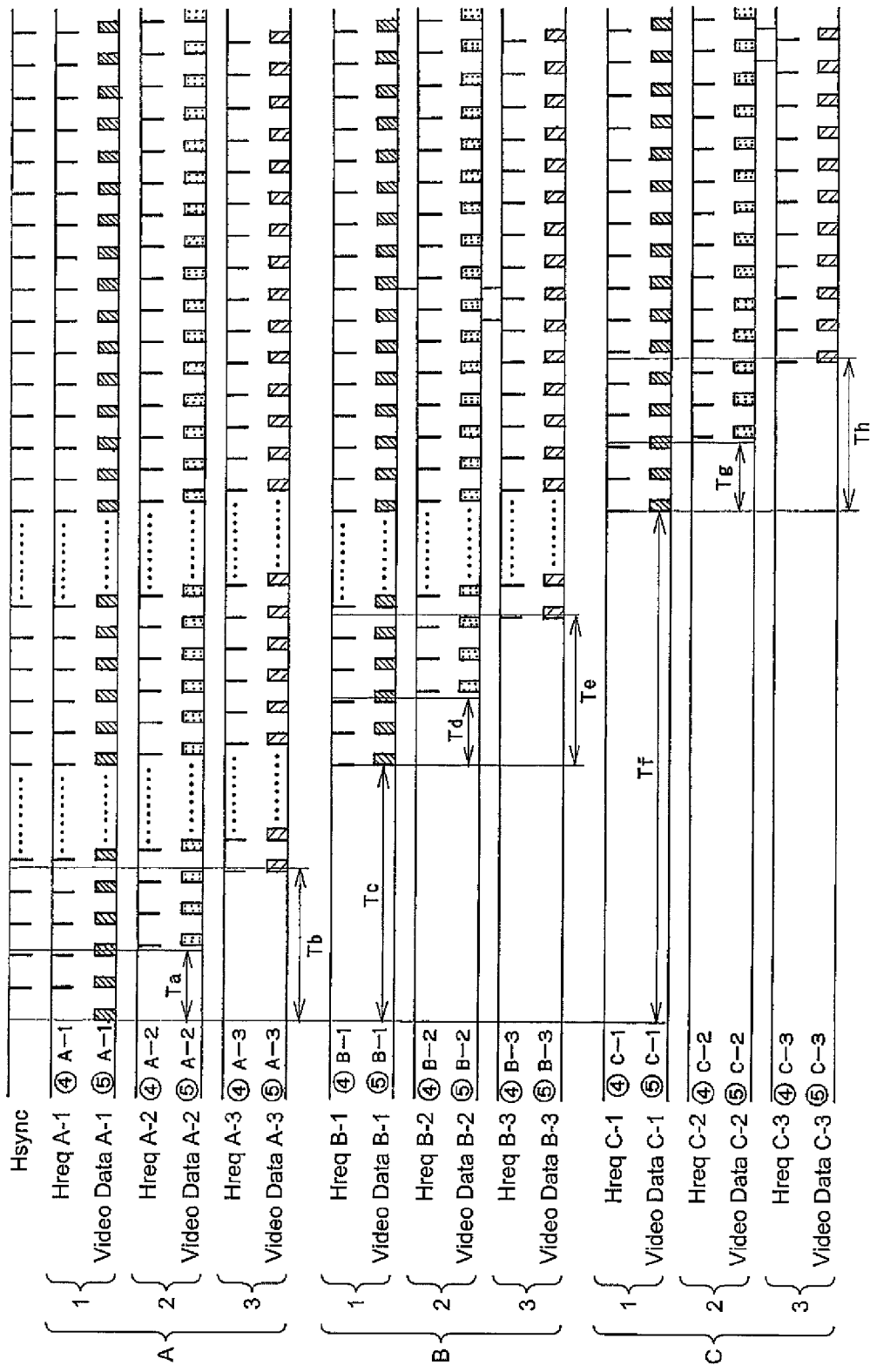
FIG. 4 is a timing chart of the embodiment shown in FIG. 1.

FIG. 4 is a timing chart according to this embodiment. In FIG. 4, the expressions such as signal circle 4A-1 and circle 5A-1 represent the corresponding expressions shown in FIG. 2. More specifically, for example, the signal circle 4A-1 represents Hreq A-1, and the signal circle 5A-1 represents videoData A-1.

As discussed with reference to FIG. 2, the video data synchronous signal Vreq is outputted from the request signal generating unit 29 (not shown in FIG. 4). After elapse of a predetermined period, the line data synchronous signal Hsync signal is transmitted from the request signal generating unit 29 to the line head control signal generating unit 28 such that the drive circuit of the line head is synchronized with the line data cycle (not shown in FIG. 2). The timing for outputting the Hsync signal is determined as reference time. That is, the Hsync signal located on the uppermost line in FIG. 4 is the reference time for processing.

A time Ta is a period from the time of operation of the light emission line 1 on the light emission group line A (supply of VideoData A-1) to the time of operation of the light emission element line 2 (supply of VideoData A-2) with delay of 2+(⅓) timing, that is, 2+(⅓ line) in the rotation direction of the photosensitive body. The time Ta corresponds to the period of delay by the amount of the exposure spot displacement within the lens on the light emission element line 2.

A time Tb is a period from the time of operation of the light emission element line 1 on the light emission element group line A to the time of operation of the light emission element line 3 (supply of VideoData A-3) with delay of 4+(⅔) timing, that is, 4+(⅔ line) in the rotation direction of the photosensitive body. The time Tb corresponds to the period of delay by the amount of the exposure spot displacement within the lens on the light emission element line 3.

A time Tc is a delay time from operation of the light emission element line 1 on the light emission element group line A to operation of the light emission element line 1 on the light emission element group line B. This time is the period for delaying the exposure position by the amount equivalent to one lens in the rotation direction of the photosensitive body. In this example, the delay time corresponds to the amount of 160 Hreq signals, and the exposure spot displacement between the lens associated with the light emission group line A and the lens associated with the light emission element group line B is corrected.

A time Td is a period from the time of operation of the light emission element line 1 on the light emission element group line B to the time of operation of the light emission element line 2 with delay of 2+(⅓) timing, that is, 2+(⅓ line) in the rotation direction of the photosensitive body. The time Td corresponds to the period of delay by the amount of the exposure spot displacement within the lens on the light emission element line 2. A time Te is a period from the time of operation of the light emission element line 1 on the light emission element group line B to the time of operation of the light emission element line 3 with delay of 4+(⅔) timing, that is, 4+(⅔ line) in the rotation direction of the photosensitive body. The time Te corresponds to the period of delay by the amount of the exposure spot displacement within the lens on the light emission element line 3.

A time Tf is a delay time from operation of the light emission element line 1 on the light emission element group line A to operation of the light emission element line 1 on the light emission element group line C. This time is the period for delaying the exposure position by the amount equivalent to two lenses in the rotation direction of the photosensitive body. In this example, the delay time corresponds to the amount of 320 Hreq signals, and the exposure spot displacement between the lens associated with the light emission element group line A and the lens associated with the light emission element group line C is corrected.

A time Tg is a period from the time of operation of the light emission element line 1 on the light emission element group line C to the time of operation of the light emission element line 2 with delay of 2+(⅓) timing, that is, 2+(⅓ line) in the rotation direction of the photosensitive body. The time Tg corresponds to the period of delay by the amount of the exposure spot displacement within the lens on the light emission element line 2. A time Th is a period from the time of operation of the light emission element line 1 on the light emission element group line C to the time of operation of the light emission element line 3 with delay of 4+(⅔) timing, that is, 4+(⅔ line) in the rotation direction of the photosensitive body. The time Th corresponds to the period of delay by the amount of the exposure spot displacement within the lens on the light emission element line 3.

According to this embodiment, therefore, the exposure spot displacement within the lens is corrected by controlling each operation timing of the light emission element lines on the light emission element group lines A, B, and C. Also, the exposure spot displacement between the lenses is corrected by controlling each operation timing of the light emission element group lines on the light emission element group lines A, B, and C. Thus, the exposure spot displacement can be corrected with high accuracy by controlling the operation timing of the light emission elements. According to the operation timing of the light emission elements, Hreq signals have the same cycles and different phases as shown in FIG. 3.

Figure 5:
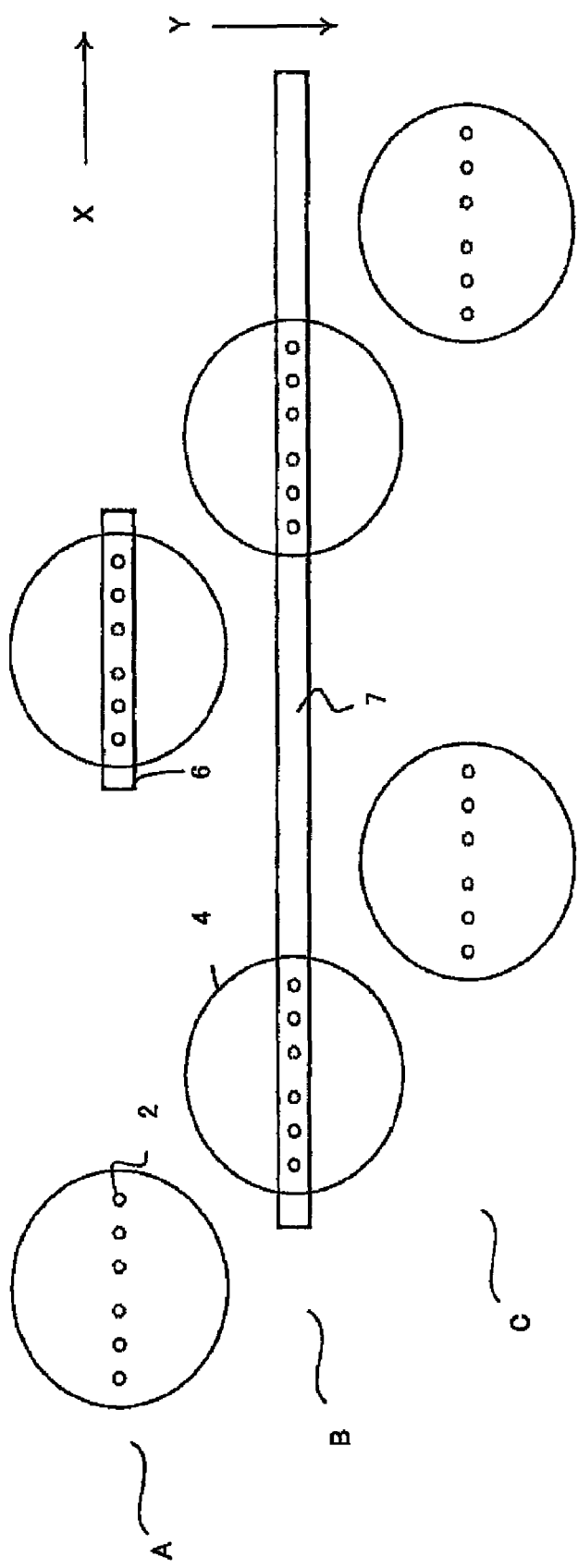
FIG. 5 illustrates another embodiment of the invention.

FIG. 5 illustrates another embodiment of the invention. The structures of MLA and light emission elements in this embodiment are initially described. The light emission element group 6 associated with the image forming lens 4 is constituted by a light emission element line disposed in a line in the X direction. Thus, the structure of this embodiment shown in FIG. 5 is different from that shown in FIG. 1 in that the light emission element group 6 associated with the image forming lens 4 does not contain a plurality of light emission lines in the rotation direction of the photosensitive body. Thus, the light emission element group lines A through C are constituted by one light emission element line. For example, the light emission element group line B is constituted by the one line of the light emission element line 7.

Figure 6:
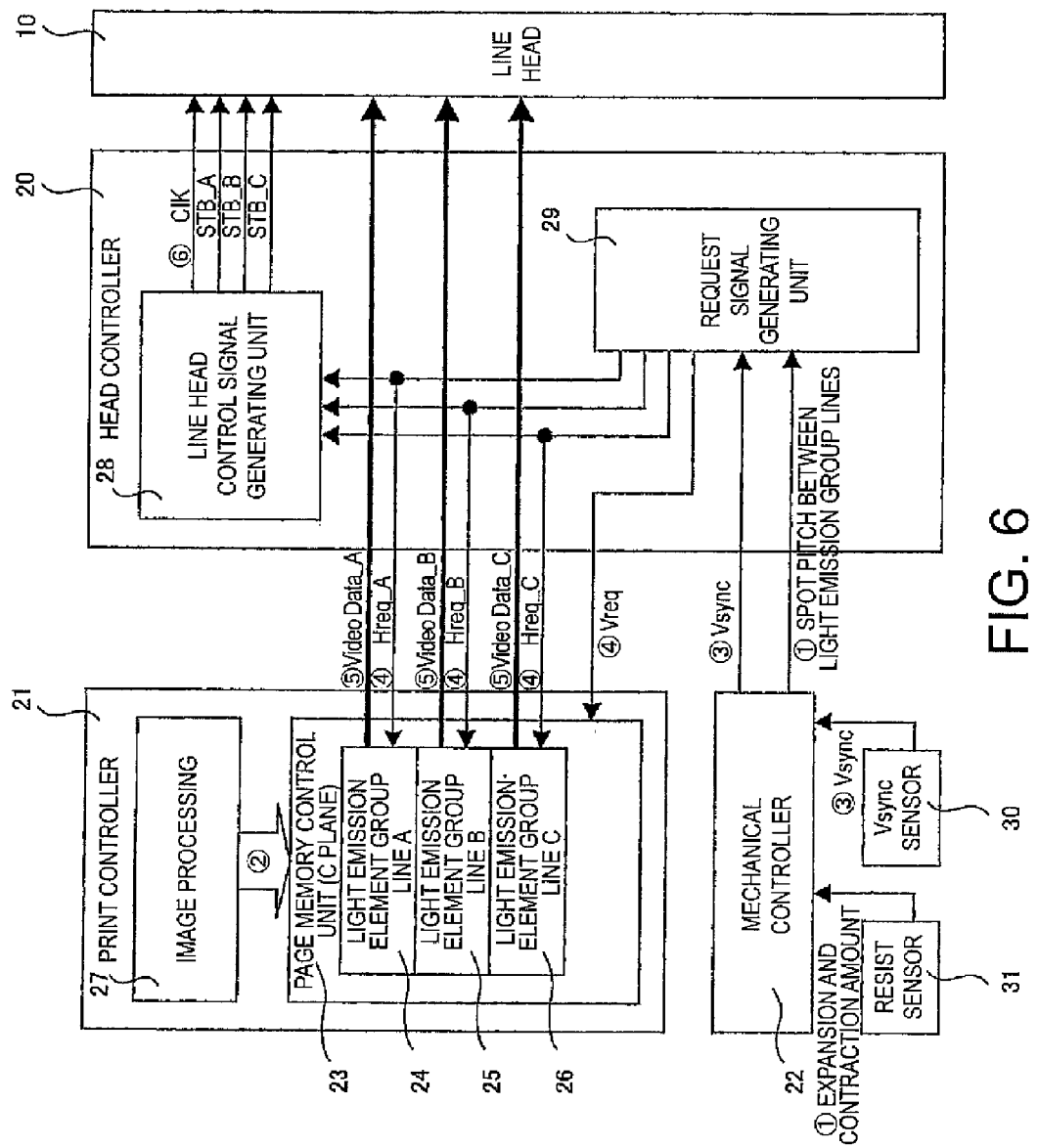
FIG. 6 is a block diagram of the embodiment shown in FIG. 5.

FIG. 6 is a block diagram showing the structure according to this embodiment. Similar reference numbers are given to parts similar to those shown in FIG. 2. Initially, the reflection-type resist sensor 31 reads the printed resist mark and measures the expansion and contract amount of the read image by μm so as to obtain the expansion and contraction amount of the image based on the ratio of the photosensitive body rotation speed to the intermediate transfer belt rotation speed (circle 1). Then, the CPU of the mechanical controller 22 calculates the spot pitch between the light emission element group lines based on the expansion and contraction amount of the read image thus measured, and transmits the calculated pitch to the request signal generating unit 29 of the head controller 20 (circle 1).

After the start of printing, the image processing unit 27 of the print controller 21 processes image data for one page of the image, and transmits the processed image data to the page memory control unit (C plane) 23 (circle 2). The page memory control unit 23 separates the processed data of the image into data for each of the lens lines (light emission element group lines), and stores the separated data in the page memories 24 through 26. It is preferable that dividing circuit or CPU performs processing when diving the image-processed data into data for each of the lens lines.

The mechanical controller 22 detects the end of the printing sheet by the optical sensor (Vsync sensor) 30, and transmits the video data synchronous signal (Vsync signal) to the request signal generating unit 29 of the head controller 20 (circle 3). The request signal generating unit 29 of the head controller 20 receives the Vsync signal and transmits a video data request signal (Vreq signal) to each of the planes (circle 4).

Then, the request signal generating unit 29 generates the line data request signal for each of the lens lines (Hreq_A, Hreq_B, Hreq_C) based on the spot pitch between the calculated lens lines, and transmits the line data request signals to the page memory control unit 23 of the print controller 21 (circle 4). The request signal generating unit 29 simultaneously transmits the line data request signal for each of the lens lines to the line head control signal generating unit 28 such that each drive circuit on the lens lines of the line head 10 can be synchronized (circle 4). Example of the drive circuit for each lens line will be described in detail later with reference to FIG. 7.

The page memory control unit 23 transmits video data for each of the lens lines (VideoData_A, VideoData_B, VIdeo-Data_C) to the line head in synchronization with the respective line data request signals (Hreq_A, Hreq_B, Hreq_C) (circle 5). In this case, the respective line data request signals have different pulse generation timing according to the degree of exposure spot displacement of the corresponding lens lines. The exposure spot displacement can be corrected by this difference of the pulse generating timing even when the spot pitch between the lens lines is a value non-integer times larger than the exposure spot diameter (single dot diameter).

The line head control signal generating unit 28 generates various types of signals (clock signals and strobe signals) for controlling the line head 10, and transmits the generated signals to the line head 10 (circle 6). The respective strobe signals (STB_A, STB_B, STB_C) are synchronized with the line data request signals (Hreq_A, Hreq_B, Hreq_C).

Figure 7:
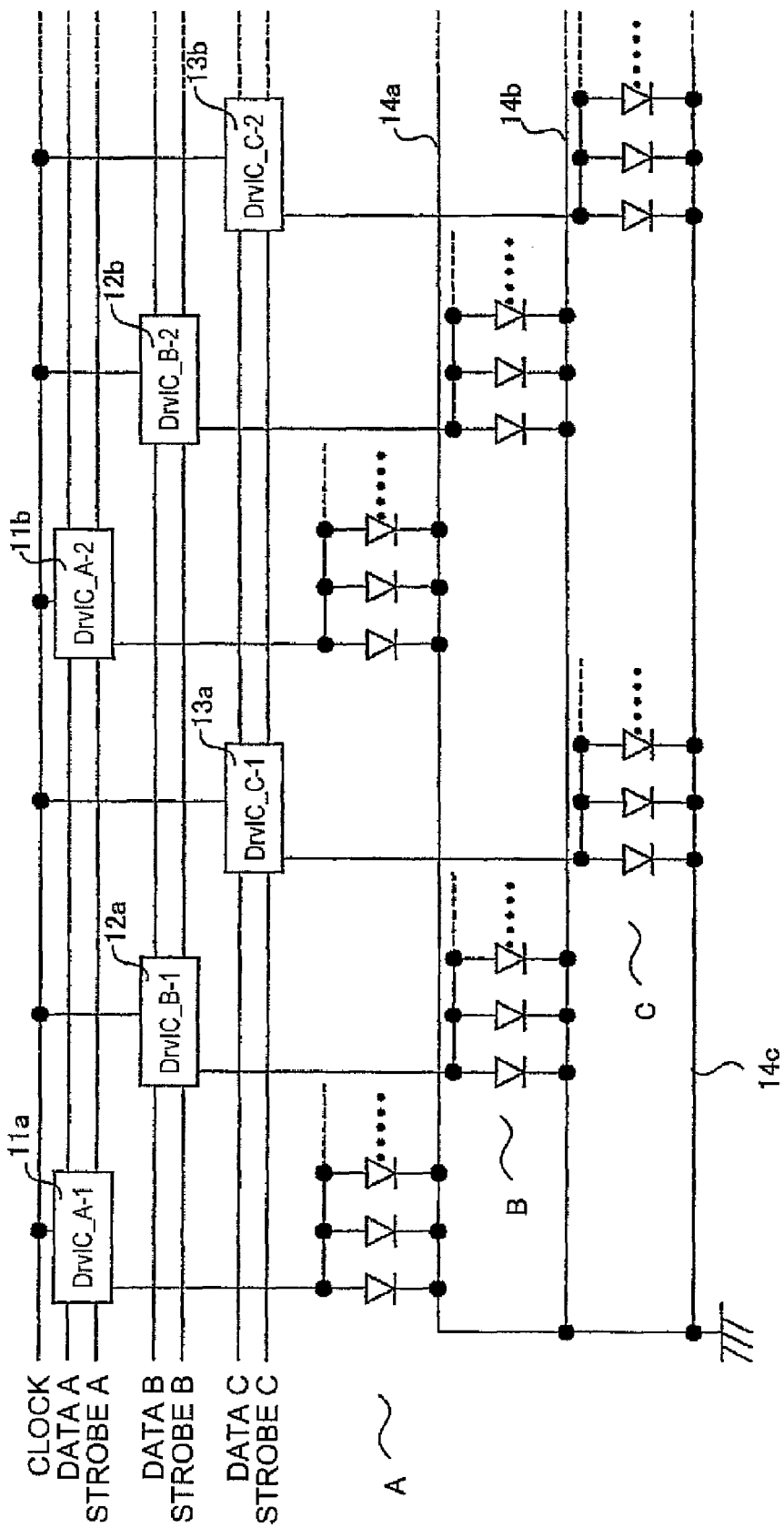
FIG. 7 is a circuit diagram of the embodiment shown in FIG. 5.

FIG. 7 is a circuit diagram showing the structure according to the embodiment shown in FIG. 6. The strobe signals are signals for specifying the period during which the light emission elements emit light. FIG. 7 shows drive circuits 11a and 11b for the light emission element group line A, drive circuits 12a and 12b for the light emission element group line B, drive circuits 13a and 13b for the light emission element group line C, and light source lines 14a through 14c.

Clock signals are supplied to all of the drive circuits 11a and 11b, 12a and 12b, and 13a and 13b. Data signal A corresponds to video data (VideoData A) shown in FIG. 6, and is supplied to the drive circuits 11a and 11b. Data signal B corresponds to video data (VideoData B) shown in FIG. 6, and is supplied to the drive circuits 12a and 12b. Data signal C corresponds to video data (VideoData C) shown in FIG. 6, and is supplied to the drive circuits 13a and 13b.

Strobe signal A is supplied to the drive circuits 11a and 11b. Strobe signal B is supplied to the drive circuits 12a and 12b. Strobe signal C is supplied to the drive circuits 13a and 13b. According to the structure shown in FIG. 7, the exposure timing for each of the lens lines can be controlled for each frequency of clocks by using strobe signals different for each lens line. As a result, the exposure spot displacement can be corrected with high accuracy even when the spot pitch between the lens lines is a value non-integer times larger than the exposure spot diameter (single dot diameter).

Figure 8:
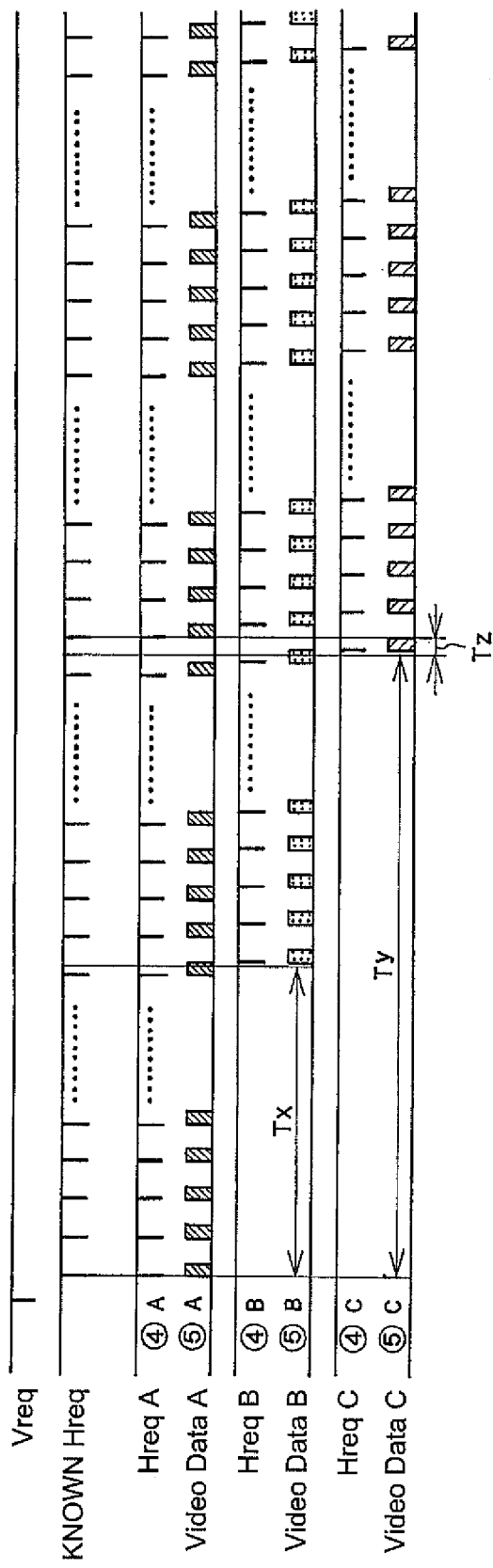
FIG. 8 is a timing chart of the embodiment shown in FIG. 5.

FIG. 8 is a timing chart according to this embodiment. In FIG. 8, the expressions such as signal circle 4A and circle 5A represent the corresponding expressions shown in FIG. 6. More specifically, for example, the signal circle 4A represents Hreq A, and the signal circle 5A represents VideoData A. The timing chart shown in FIG. 8 is now described. The video data synchronous signal Vreq is outputted from the request signal generating unit 29. After elapse of a predetermined period, the line data synchronous signal Hsync signal is transmitted from the request signal generating unit 29 to the line head control signal generating unit 28 such that the drive circuit of the line head is synchronized with the line data cycle (not shown in FIG. 8). The timing for outputting the Hsync signal is determined as reference time.

A time Tx is a delay period from the time of operation of the light emission element line 1 on the light emission group line A to the time of operation of the light emission element line 1 on the light emission element group line B. This time is a period for delaying the exposure position by the amount equivalent to one lens in the rotation direction of the photosensitive body. In this example, the delay time corresponds to the amount of Hreq signal 60 plus ⅓ for correcting the exposure spot displacement between the lens associated with the light emission element group line A and the lens associated with the light emission element group line B.

A time Ty is a delay period from the time of operation of the light emission element line 1 on the light emission element group line A to the time of operation of the light emission element line 1 on the light emission element group line C. This time is a period for delaying the exposure position by the amount equivalent to two lenses in the rotation direction of the photosensitive body. In this embodiment, the delay time corresponds to the amount of Hreq signal 120 plus ⅔ for correcting the exposure spot displacement between the lens associated with the light emission element group line A and the lens associated with the light emission element group line C. A time Tz is time for reading page memory three times after dividing the Hreq signal used in known method into three.

Figure 13A:
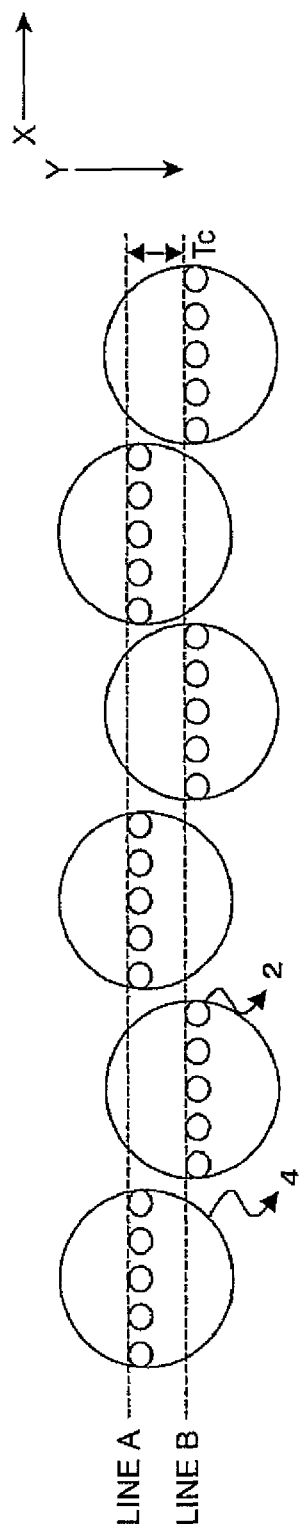
FIGS. 13A and 13B illustrate a further embodiment of the invention.
Figure 13B:
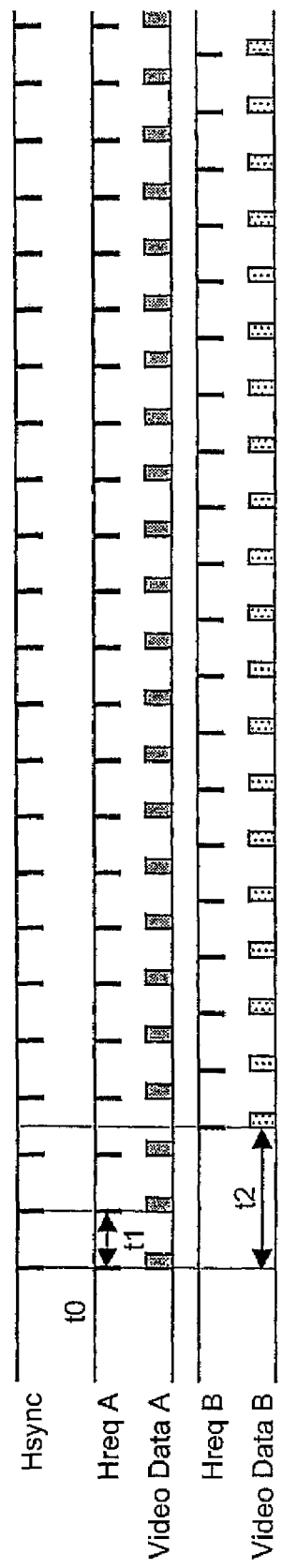

FIGS. 13A and 13B illustrate a further embodiment of the invention. According to the structure shown in FIG. 13A, the image forming lenses 4 are shifted in the Y direction. Similarly to the above embodiments, the plural image forming lenses 4 are provided in the rotation direction of the photosensitive body in this embodiment. As shown in FIG. 13A, a pitch Tc between the light emission element lines A and B constituted by the light emission elements 2 corresponding to the respective image forming lenses 4 is 2.5 dots (non-integer times larger value than dot diameter).

The light emission element line A corresponds to one image forming lens on the upstream side as viewed in the rotation direction of the photosensitive body in the plural image forming lenses disposed in the rotation direction of the photosensitive body. The light emission element line B corresponds to one image forming lens on the downstream side (at the subsequent position) as viewed in the rotation direction of the photosensitive body in the plural image forming lenses disposed in the rotation direction of the photosensitive body.

FIG. 13B is a timing chart for forming a linear latent image in the X direction (main scanning direction) by using the line head having the structure shown in FIG. 13A. In FIG. 13B, the timing for turning on the initial light emission element on the light emission element line A is set at t0, and the timing for turning on the next light emission element on the light emission element line A is set at a time after t1 from the time t0. The time t1 corresponds to the period of Hsync cycle=HreqA cycle.

Next, the timing for turning on the initial light emission element on the light emission element line B is set at a time after t2 from t0. In this case, one linear latent image is formed by using the light emission element on the light emission element line A and the light emission element on the light emission element line B, and the spot pitch displacement in the Y direction (sub scanning direction) by the amount of 2.5 dots on the A line and B line needs to be corrected. Thus, an HreqB signal is outputted after generation of the initial Hsync signal at t0 with delay of 2.5·t1. In this example, $t2=2.5 \cdot t1$ holds.

Thus, in a general expression, $t2=n \cdot t1$ (n: 2 or larger integer) holds.

Accordingly, in the structure shown in FIGS. 13A and 13B, the exposure spot displacement in the Y direction is corrected with high accuracy even when the exposure spot pitch in the Y direction between the plural light emission element lines disposed in the Y direction is not a value non-integer times larger than the exposure spot diameter (diameter of single dot). Thus, the user can obtain high-quality images.

Figure 14:
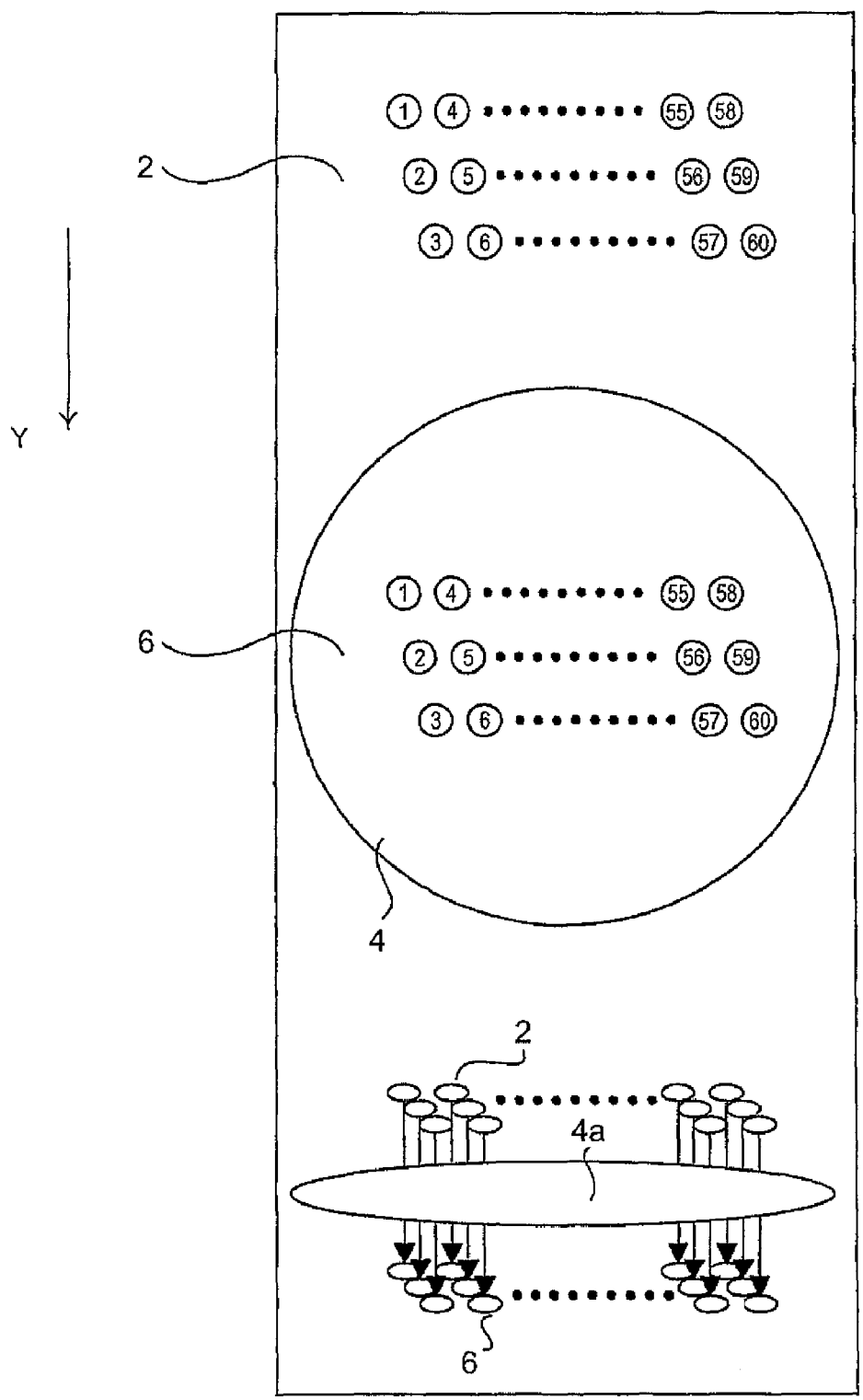
FIG. 14 illustrates an image forming lens having positive magnification.

According to the invention, a lens having minus optical magnification is used. Thus, arrangement change of data is needed, which is unnecessary for a lens having positive optical magnification. This point is now discussed in detail. FIG. 14 illustrates the relationship between the arrangement of the light emission elements when the lens having positive optical magnification is used and the latent image formed on the photosensitive body.

In FIG. 14, the light emission element 2 contains circle 1 through circle 60 (circled numerals are expressed as circle 1, for example, for the reason of transcription conversion). FIG. 14 also shows the lens 4 and the latent image 6. In this example, image forming dots circle 1 through circle 60 of the latent image formed on the photosensitive body via the lens 4 correspond to the light emission elements circle 1 through circle 60. An arrow Y represents the rotation direction of the photosensitive body.

Figure 15:
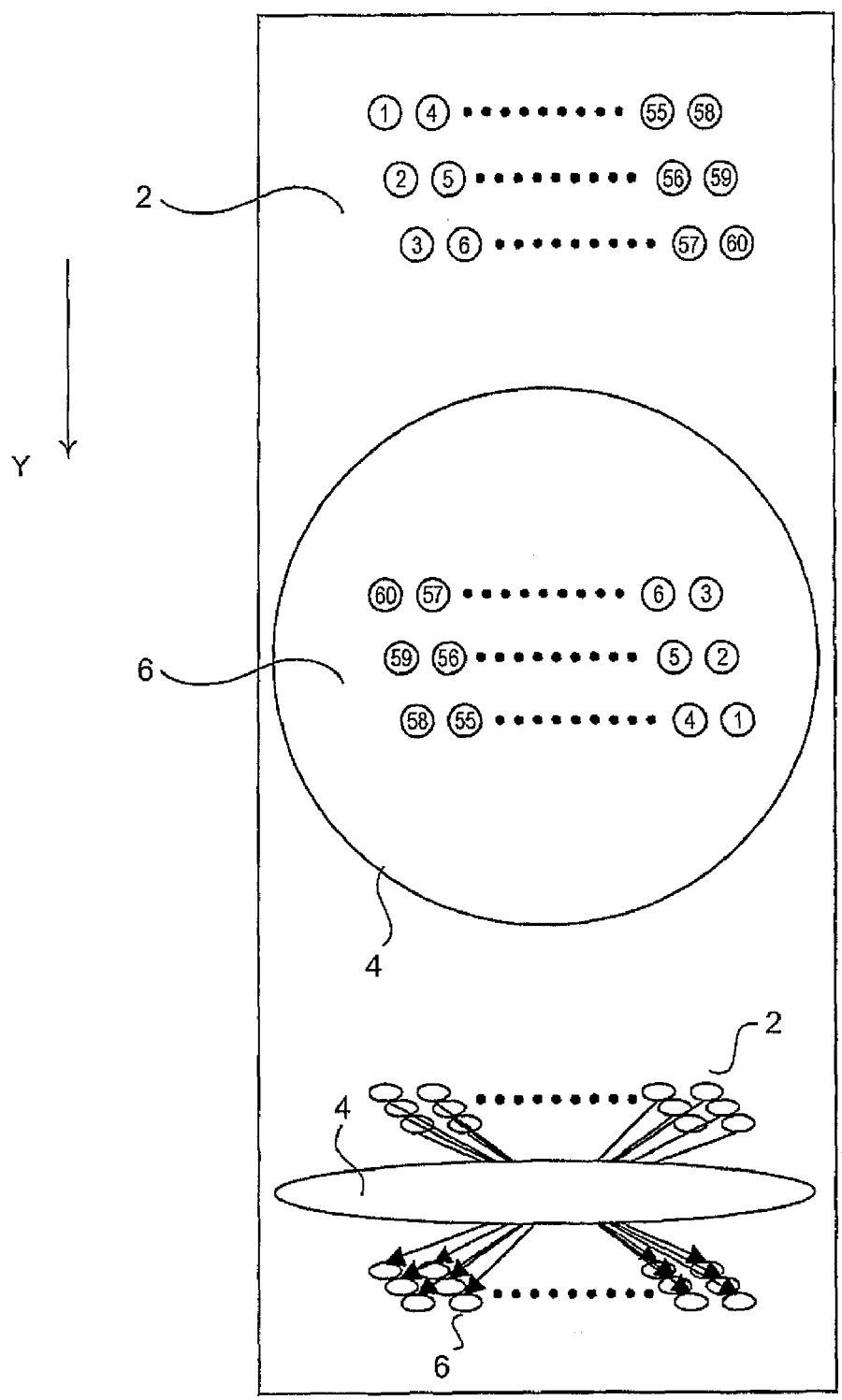
FIG. 15 illustrates an image forming lens having negative magnification.

FIG. 15 illustrates a case in which a lens having minus optical magnification is used. In FIG. 15, the light emission element 2 contains circle 1 through circle 60 similarly to the case shown in FIG. 14. The lens 4 having minus optical magnification outputs light to the photosensitive body in the directions opposite to the axial direction and rotation direction of the photosensitive body. Thus, the arrangement of the image forming dots circle 1 through circle 60 formed on the photosensitive body is reversed from the arrangement of those in the light emission element 2 with respect to the axial direction and rotation direction of the photosensitive body. Thus, when the latent image is formed on the photosensitive body in the same manner as in the case shown in FIG. 14, arrangement change of data is necessary such that the data is reversed in the axial direction and rotation direction of the photosensitive body.

Figure 16:
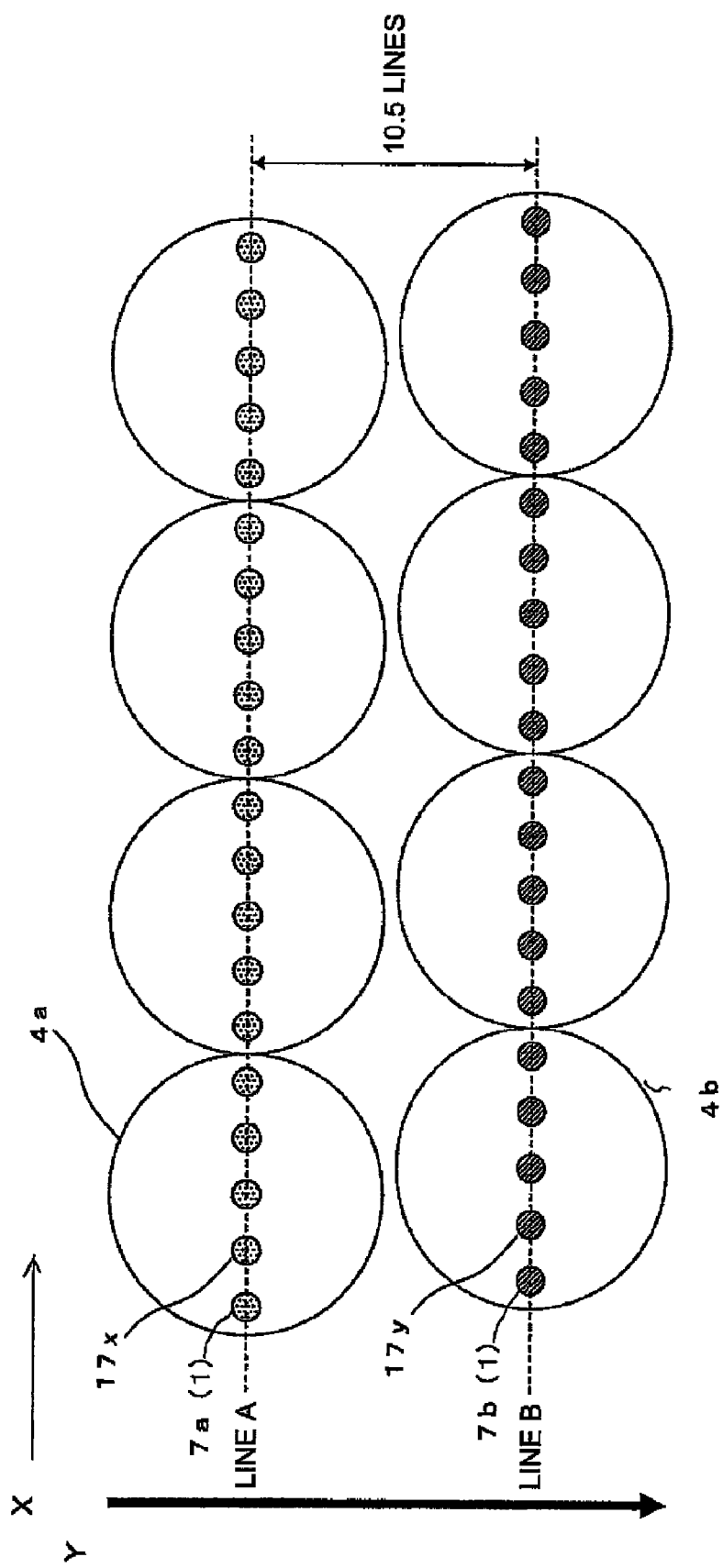
FIG. 16 illustrates a still further embodiment of the invention.

FIG. 16 illustrates a still further embodiment of the invention. As shown in FIG. 16, the plural image forming lenses 4 are disposed in the axial direction and rotation direction of the photosensitive body. According to this example, first image forming systems 4a, and second image forming systems 4b disposed in the rotation direction of the photosensitive body (Y direction, i.e., first direction) are equipped. The light emission element lines A and B are positioned in correspondence with the image forming lenses provided in the axial direction (x direction, i.e., second direction) of the photosensitive body. The light emission elements disposed on the light emission element lines A and B are shifted from each other in the axial direction of the photosensitive body. For example, the position of the initial light emission element 7a(1) on the light emission element line A in the axial direction of the photosensitive body is shifted from the position of the initial light emission element 7b(1) on the light emission element line B in the axial direction of the photosensitive body. According to the example shown in FIG. 16, a first latent image 17x is formed on the photosensitive body as a scanned surface by the light emission element (first light emission element) on the light emission element line A corresponding to the first image forming system 4a. Also, a third latent image 17y is formed on the photosensitive body as a scanned surface by the light emission element (second light emission element) on the light emission element line B corresponding to the second image forming system 4b.

Figure 19A:
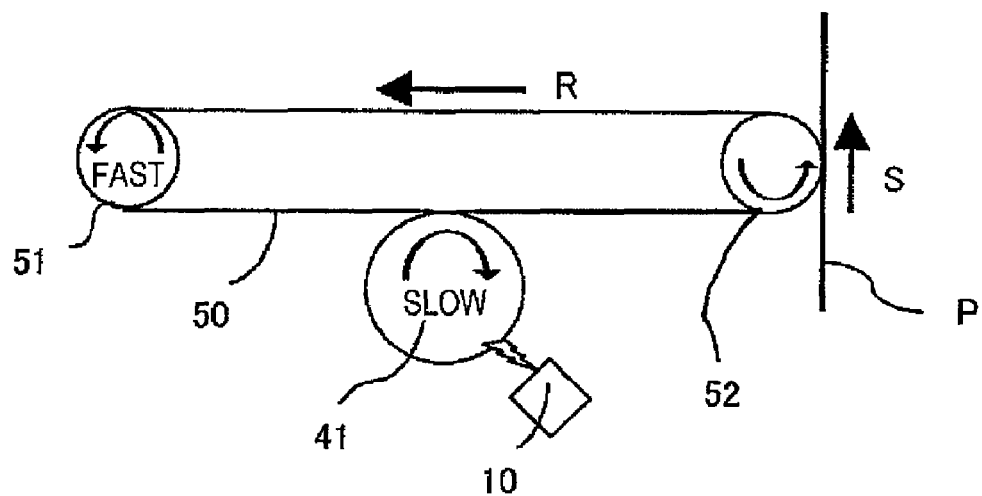
FIGS. 19A and 19B illustrate a related art.
Figure 19B:
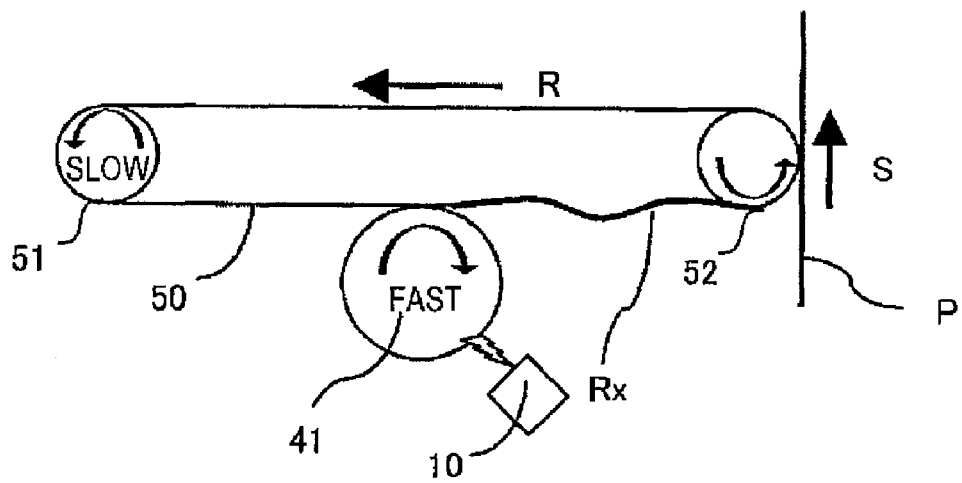

The spot pitch (distance) between the latent images 17x and 17y formed on the photosensitive body by the light emission element lines A and B is equivalent to the distance of 10.5 lines of the spot diameter of the latent image formed by the first light emission element. Thus, the spot pitch between the light emission element lines corresponding to each image forming lens is a value non-integer times larger than the exposure spot diameter. Since the light emission element lines A and B are disposed along the respective center lines of the image forming lenses provided in the axial direction of the photosensitive body, the spot pitch between the light emission element lines A and B corresponds to the exposure spot pitch between image forming lens lines provided in the rotation direction of the photosensitive body. Thus, in the example shown in FIGS. 19A and 19B, the exposure spot pitch between the image forming lens lines disposed in the rotation direction of the photosensitive body is a value non-integer times larger than the exposure spot diameter.

FIG. 17 is a timing chart of a process for controlling the light emission element lines A and B according to the example shown in FIG. 16. FIG. 17 shows (a) as Hsync signal, (b) as Hreq A signal (Hreq signal on light emission element line A), (c) as VideoData A signal (Videodata Signal on light emission element group line A), (d) as Hreq B signal (Hreq signal on light emission element line B), (e) as VideoData B signal (Videodata signal on light emission element group line B).

In (a) of FIG. 17, the timing for turning on the initial light emission element on the light emission element line A is t0, and the timing for turning on the subsequent light emission element on the light emission element line A is set at a time after time t1 from the time t0. Then, the timing for turning on the initial light emission element on the light emission element line B is set at a time after time t2 from the time t0. TA0, TA1 through TA15, and others represent timing for transmitting the line data request signal Hreq A to the light emission element on the light emission line A. TB0, TB1 through TB7, and others represent timing for transmitting the line data request signal HreqB to the light emission element on the light emission element line B. In this example, t2 is set between TA10 and TA11, and the relation t2≠n·t1 (n: 2 or larger integer) holds.

FIG. 18 shows an example of exposure spot produced on the photosensitive body when the light emission elements provided on the light emission element lines A and B are turned on according to the timing chart shown in FIG. 17. In FIG. 18 (a) represents an exposure spot 17x(1) formed on the photosensitive body when the initial light emission element on the light emission element line is turned on at the timing TA0 (time t0), and (b) represents an exposure spot 17x(2) formed on the photosensitive body when the light emission element on the light emission element line A is turned on at the timing TA1 (time t2). The exposure spot 17x (1) corresponds to the first latent image, and the exposure spot 17x(2) corresponds to the second latent image. In this case, the spot pitch between the first latent image 17x(1) and the second latent image 17x(2) is a value non-integer times larger than the spot diameter of the latent image formed on the scanned surface by the first light emission element corresponding to the light emission element line A described with reference to FIG. 16.

In the figure, (c) represents an exposure spot 17x(3) formed on the photosensitive body when the light emission element on the light emission element line A is turned on at the timing TA2. Exposure spots are sequentially formed on the photosensitive body in the similar manner, and (d) represents an exposure spot 17x(10) formed on the photosensitive body when the light emission element on the light emission element line A is turned on at the timing TA10.

In the figure, (e) represents an exposure spot formed on the photosensitive body when the initial light emission element on the light emission element line B is turned on at the timing TB0 (time t2). This case shows the exposure spot 17*x*(10) formed on the photosensitive body by the light emission element on the light emission element line A, and the exposure spot 17*y*(1) formed by the light emission element on the light emission element line B. The exposure spot 17*y* is positioned in the direction orthogonal to or substantially orthogonal to the exposure spot 17*x* in the Y direction (first direction). As illustrated in FIG. 16, the positions of the light emission elements on the light emission element line A and light emission element line B are shifted from each other in the axial direction of the photosensitive body. In this case, each exposure spot formed by the light emission element on the light emission element line B in the axial direction of the photosensitive body is sandwiched between the exposure spots formed by the light emission elements on the light emission element line A in the axial direction of the photosensitive body. As a result, a single linear latent image is formed between the exposure spots with only small clearance in the axial direction of the photosensitive body. Thus, the image quality improves.

In the figure, (f) shows an exposure spot 17*x*(11) formed on the photosensitive body when the light emission element on the light emission element line A is turned on at the timing TA11, and the exposure spot 17*y*(1) discussed above in (e). Also, (g) shows an exposure spot 17*y*(2) formed on the photosensitive body when the light emission element on the light emission element line B is turned on at the timing TB1, and the exposure spot 17*x*(11) on the light emission element line A discussed above in (f).

Figure 9:
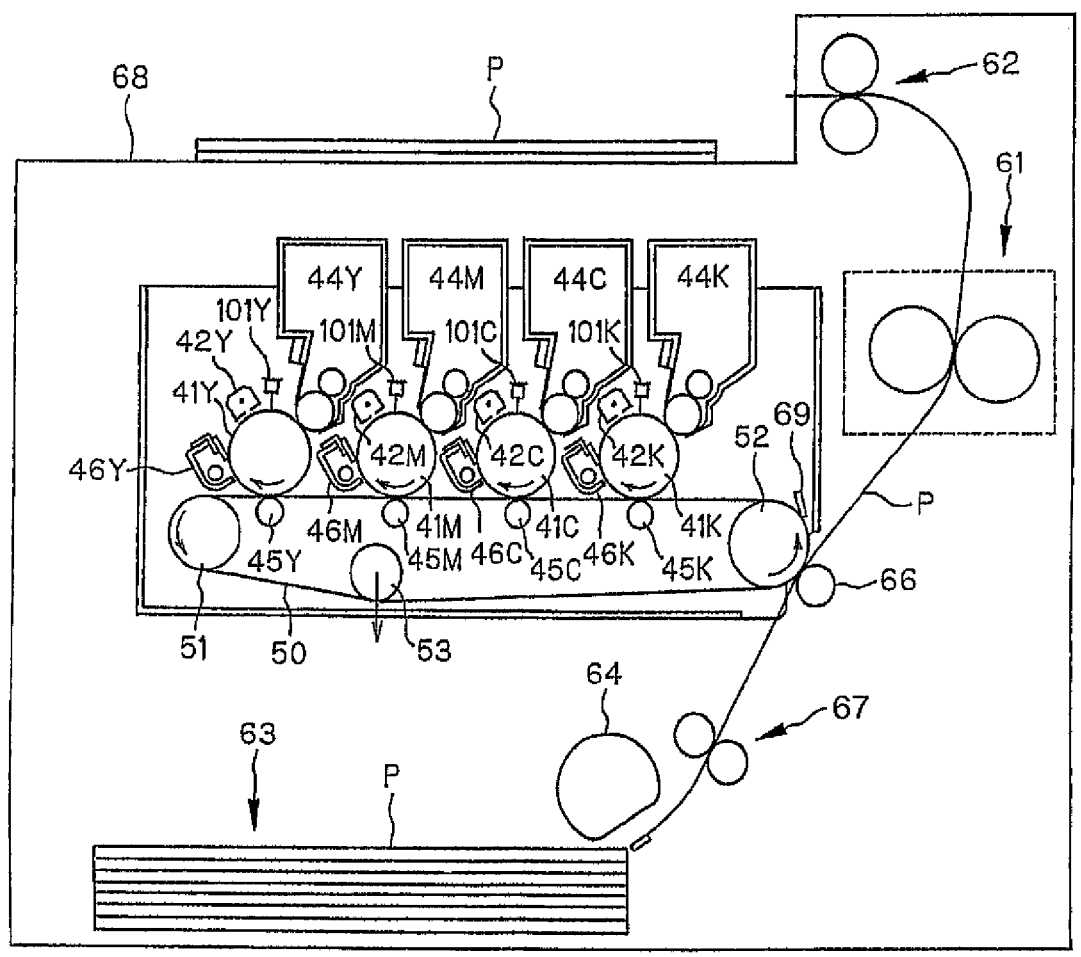
FIG. 9 is a vertical cross-sectional side view of an image forming apparatus according to an embodiment of the invention.

This embodiment has been applied to a line head structure included in a tandem-type color printer (image forming apparatus) which performs exposure on four photosensitive bodies using four line heads to simultaneously form four color images and transfer the images on one endless intermediate transfer belt (intermediate transfer medium). FIG. 9 is a vertical cross-sectional side view showing an example of a tandem-type image forming apparatus using organic EL elements as light emission elements. This image forming apparatus includes four line heads 101K, 101C, 101M, and 101Y having similar structure and disposed at exposure positions of corresponding four photosensitive bodies (image carrying bodies) 41K, 41C, 41M, and 41Y having similar structure.

As shown in FIG. 9, the image forming apparatus includes a drive roller 51, a driven roller 52, and a tension roller 53, and further an intermediate transfer belt (intermediate transfer medium) 50 circulated by the tension roller 53 in the direction of an arrow in the figure. The photosensitive bodies 41K, 41C, 41M, and 41Y are disposed on the intermediate transfer belt 50 at predetermined intervals. The symbols K, C, M, and Y added to the ends of the reference numerals represent black, cyan, magenta, and yellow, respectively. The photosensitive bodies 41K through 41Y are rotated in the direction indicated by arrows in the figure (clockwise direction) in synchronization with the drive of the intermediate transfer belt 50. Electrifying units 42 (K, C, M, and Y) and line heads 101 (K, C, M, and Y) are provided around the respective photosensitive bodies 41 (K, C, M, and Y).

The image forming apparatus also includes developing devices 44 (K, C, M, and Y) which supply toner as developer to electrostatic latent images formed by the line heads 101 (K, C, M, and Y) to form visual images, primary transfer rollers 45 (K, C, M, and Y), and cleaning devices 46 (K, C, M, and Y). The light emission energy peak wavelength of the respective line heads 101 (K, C, M, and Y) is so determined as to substantially coincide with the sensitivity peak wavelength of the photosensitive bodies 41 (K, C, M, and Y).

The respective toner images in black, cyan, magenta, and yellow formed by the four monochrome toner image forming stations in four colors are sequentially transferred onto the intermediate transfer belt 50 as primary transfer by primary transfer bias applied to primary transfer rollers 45 (K, C, M, and Y). The toner image as a full-color image formed by staking the four monochrome toner images on the intermediate transfer belt 50 is transferred to a recording medium P such as sheet as secondary transfer by a secondary transfer roller 66. Then, the toner image thus transferred is fixed to the recording medium P while passing through a pair of fixing rollers 61 as a fixing unit, and is discharged onto a discharge tray 68 provided at the upper position of the apparatus by a pair of discharging rollers 62.

The image forming apparatus also includes a sheet feed cassette 63 for holding a plurality of recording media P in a stacked manner, a pickup roller 64 for picking the recording medium P from the sheet feed cassette 63 one by one, a pair of gate rollers 67 for specifying the feed timing of the recording medium P to the secondary transfer unit of the secondary transfer roller 66, the secondary transfer roller 66 as the secondary transfer unit constituting the secondary transfer section between the intermediate transfer belt 50 and the secondary transfer roller 66, and a cleaning blade 69 for removing toner remaining on the surface of the intermediate transfer belt 50 after secondary transfer.

The image forming apparatus such as an electronic picture printer having MLA and line head according to the invention can correct exposure spot displacement in the Y direction with high accuracy even when the exposure spot pitch in the Y direction between the plural light emission element group lines (lens lines) provided in the Y direction (rotation direction of photosensitive body) is a value non-integer times larger than the exposure spot diameter (single dot diameter). Thus, the user can obtain high-quality images.

According to the embodiments of the invention, LED, organic EL, VCSEL (vertical cavity surface emitting laser) and the like can be used as light emission elements of the light emission array.

According to these embodiments, the positions and directions of the image forming system and light emission elements of the line head and the directions of the latent images formed on the photosensitive body (image carrying body, i.e., scanned surface) are considered as follows. The plural image forming systems are disposed in the rotation direction of the photosensitive body (first direction). The axial direction of the photosensitive body (direction orthogonal to or substantially orthogonal to the first direction) is the second direction. Each of the image forming systems contains light emission elements, and only one line of the light emission elements is provided in the first direction in a certain case as illustrated in FIGS. 13A and 13B and FIG. 16. In other case, plural lines of the light emission elements are provided in the first direction as shown in FIG. 1. Each of the image forming systems may be constituted by an inverting system such as a lens having minus optical magnification.

In case of the example shown in FIG. 1, the first latent image is the latent image formed by the first light emission element at the time t0 in the second direction of the photosensitive body during shift of the photosensitive body in the Y direction (first direction). The second latent image is the latent image formed by the first light emission element after time t1 from the time t0 in the second direction of the photosensitive body. The third latent image is the latent image formed by the second light emission element after time t2 from the time t0 in the second direction of the photosensitive body. The fourth latent image is the latent image formed by the third light emission element in the second direction of the photosensitive body.

When the image forming system having minus optical magnification is used, the first latent image is formed after formation of the fourth latent image such that the fourth latent image and the first latent image can be disposed in the second direction of the latent image carrying body. In this case, the latent image is constituted by one line in the second direction as explained with reference to FIG. 12. When the image forming system corresponding to the light emission element group line B is the second image forming system with the light emission element on the light emission line 7b determined as the second light emission element in case of the example in FIG. 1, the light emission element on the light emission element line 7a disposed in the direction opposite to the first direction (Y direction) is the fourth light emission element. In this case, the third spot pitch between the second latent image and the fifth latent image formed on the latent image carrying body by the fourth light emission element is a value non-integer times larger than the spot diameter of the latent image.

After formation of the fifth latent image, the second latent image is formed and the fifth latent image and the second latent image are disposed in the second direction of the latent image carrying body. In this case, a latent image thus produced is constituted by one line in the second direction similarly to the case discussed with reference to FIG. 12. According to these embodiments, the first latent image, the third latent image, the fourth latent image, and the fifth latent image can be disposed in the second direction of the latent image carrying body.

While the line head control method, image forming method, and image forming apparatus capable of correcting exposure spot displacement for each of the light emission element lines and each of the light emission element group lines (lens lines) and preventing deterioration of the image quality are described according to these embodiments, various modifications and changes may be made in the invention without limiting these embodiments.

What is claimed is:

1. A control method of a line head including:
   a first image forming system;
   a first light emission element which emits light for forming an image by an image forming lens of the first image forming system;
   a second image forming system disposed in a first direction of the first image forming system; and
   a second light emission element which emits light for forming an image by an image forming lens of the second image forming system,
   the method comprising:
   when the first light emission element emits light at a time t0 and then emits light after a time t1 from the time t0, and also when the second light emission element emits light after a time t2 from the time t0,
   controlling the time t1 and the time t2 such that t2≠n·t1 (n: 2 or larger integer) holds,
   wherein a first spot pitch between a first latent image formed on a scanned surface shifting in the first direction when the first light emission element emits light at the time t0 and a second latent image formed on the scanned surface when the first light emission element emits light at the time t1 is a value non-integer times larger than the spot diameter of a latent image formed on the scanned surface by the first light emission element.

2. The line head control method according to claim 1, wherein the first latent image and a third latent image formed on the scanned surface when the second light emission element emits light at the time t2 are disposed orthogonal to or substantially orthogonal to the first direction.

3. The line head control method according to claim 2, further comprising:
   a third light emission element disposed in the first direction of the first light emission element to emit light for forming an image by the first image forming system,
   wherein a second spot pitch between the first latent image and a fourth latent image formed on the scanned surface by the third light emission element is a value non-integer times larger than the spot diameter of the latent image.

4. The line head control method according to claim 1, wherein the image forming system is a lens having minus optical magnification.

5. An image forming method in an image forming apparatus including:
   a latent image carrying body which shifts in a first direction;
   a first image forming system;
   a first light emission element which emits light for forming an image by an image forming lens of the first image forming system;
   a second image forming system disposed in the first direction of the first image forming system; and
   a second light emission element which emits light for forming an image by an image forming lens of the second image forming system,
   the method comprising:
   when the first light emission element emits light at a time t0 and then emits light after a time t1 from the time t0, and also when the second light emission element emits light after a time t2 from the time t0,
   controlling the time t1 and the time t2 such that t2≠n·t1 (n: 2 or larger integer) holds,
   wherein a first spot pitch between a first latent image formed on the latent image carrying body when the first light emission element emits light at the time to and a second latent image formed on the latent image carrying body when the first light emission element emits light at the time t1 is a value non-integer times larger than the spot diameter of a latent image formed on the latent image carrying body by the first light emission element.

6. The image forming method according to claim 5, wherein the first latent image and a third latent image formed on the latent image carrying body when the second light emission element emits light at the time t2 are disposed in a second direction orthogonal to or substantially orthogonal to the first direction.

7. The image forming method according to claim 6, further comprising:
   a third light emission element disposed in the first direction of the first light emission element to emit light for forming an image by the first image forming system,
   wherein a second spot pitch between the first latent image and a fourth latent image formed on the latent image carrying body by the third light emission element is a value non-integer times larger than the spot diameter of the latent image.

8. The image forming method according to claim 7, wherein:
   the first image forming system is an inverting system; and the first latent image is formed after the fourth latent image is formed, and the fourth latent image and the first latent image are disposed in the second direction of the latent image carrying body.

9. The image forming method according to claim 8, further comprising:
   a fourth light emission element disposed in a third direction opposite to the first direction of the second light emission element to emit light for forming an image by the second image forming system,
   wherein a third spot pitch between the second latent image and a fifth latent image formed on the latent image carrying body by the fourth light emission element is a value non-integer times larger than the spot diameter of the latent image.

10. The image forming method according to claim 7, wherein:
   the second image forming system is an inverting system; and
   the second latent image is formed after a fifth latent image is formed, and the fifth latent image and the second latent image are disposed in the second direction of the latent image carrying body.

11. The image forming method according to claim 10, wherein the first latent image, the third latent image, the fourth latent image, and the fifth latent image are disposed in the second direction of the latent image carrying body.

12. The image forming method according to claim 5, wherein the first image forming system and the second image forming system are lenses having minus optical magnification.

* * * * *